(12) United States Patent
Mostafa et al.

(10) Patent No.: US 11,238,321 B2
(45) Date of Patent: Feb. 1, 2022

(54) SMART DOCUMENT FORMAT SYSTEM

(71) Applicant: KYOCERA DOCUMENT SOLUTIONS INC., Osaka (JP)

(72) Inventors: Mohamed Al Sayed Mostafa, Hawthorne, CA (US); Neil-Paul Payoyo Bermundo, Glendora, CA (US); Duc Phu Truong, West Covina, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/836,161

(22) Filed: Mar. 31, 2020

(65) Prior Publication Data

US 2021/0303944 A1 Sep. 30, 2021

(51) Int. Cl.
*G06K 15/00* (2006.01)
*G06K 15/02* (2006.01)
*G06F 3/12* (2006.01)

(52) U.S. Cl.
CPC ....... *G06K 15/1805* (2013.01); *G06F 3/1204* (2013.01); *G06F 3/1248* (2013.01); *G06F 3/1298* (2013.01); *G06K 15/1811* (2013.01); *G06K 15/1814* (2013.01)

(58) Field of Classification Search
CPC ............. G06K 15/1805; G06K 15/181; G06K 15/1811; G06K 15/1814; G06F 3/1248; G06F 3/1244; G06F 3/1298
See application file for complete search history.

(56) References Cited

U.S. PATENT DOCUMENTS

| | | | |
|---|---|---|---|
| 10,783,412 B1* | 9/2020 | Truong | G06F 3/1215 |
| 11,030,496 B1* | 6/2021 | Mostafa | G06K 15/1805 |
| 2012/0133984 A1* | 5/2012 | Hayakawa | G06F 3/1285 |
| | | | 358/1.16 |
| 2018/0035006 A1* | 2/2018 | Bermundo | G06F 3/1285 |
| 2018/0082159 A1* | 3/2018 | Torii | G06K 15/1813 |

* cited by examiner

*Primary Examiner* — Benjamin O Dulaney
(74) *Attorney, Agent, or Firm* — GrowIP Law Group LLC

(57) ABSTRACT

Methods and apparatus for encoding data streams are provided. A computing device can receive an encoder-input data stream (EIDS) encoded in a encoder-input format. The computing device can reformat the EIDS into an encoder-output data stream (EODS) encoded in an encoder-output format that differs from the encoder-input format. The EODS can include a page table for pages, resources of the pages that include reusable resources used multiple times, and binary-formatted commands related to the resources, which are stored in stored in first-come, first-served fashion. The page table can refer to pages of the EODS. The EODS can be based on a resource table storing entries for each reusable resource. Each reusable resource is stored only once in the EODS. The computing device can generate an output based on the EODS.

20 Claims, 14 Drawing Sheets

1300

1310 Receive, at a computing device, an encoder-input data stream encoded in a first format

1320 Reformat the encoder-input data stream into an encoder-output data stream encoded in a second format using the computing device, the encoder-output data stream including a page table for one or more pages in the encoder-output data stream, one or more resources of the one or more pages in the encoder-output data stream, and one or more commands related to the one or more resources, the one or more commands in a binary format, the page table including references to the one or more pages of the encoder-output data stream, the one or more resources including one or more reusable resources that are used multiple times in the encoder-output data stream, where the first format differs from the second format, where the encoder-output data stream is based on a resource table storing entries for each of the one or more reusable resources, where each of the one or more reusable resources is stored only once in the encoder-output data stream, and where the one or more resources are stored in first-come, first-served fashion in the encoder-output data stream

1330 Generate an output of the computing device that is based on the encoder-output data stream

1410 Receive, at a computing device, a decoder-input data stream encoded in a first format, the decoder-input data stream including a page table for one or more pages in the decoder-input data stream, one or more resources of the one or more pages in the decoder-input data stream, and one or more commands related to the one or more resources; the one or more commands in a binary format, the page table including references to the one or more pages of the decoder-input data stream, the one or more resources including one or more reusable resources that are used multiple times in the decoder-input data stream, where each of the one or more reusable resources is stored only once in the decoder-input data stream, and where the one or more resources are stored in first-come, first-served fashion in the decoder-input data stream 1420 Decode the decoder-input data stream by the computing device executing the one or more commands to generate an output depicting the one or more pages 1430 Provide the output depicting the one or more pages using the computing device

FIG. 14

SMART DOCUMENT FORMAT SYSTEM

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server.

The networks can include many printing devices. Some or all of the printing devices can have different features, functions, and capabilities. For example, some printing devices print in color, while others do not. As another example, some printing devices are equipped with duplexing hardware that allows printing on both sides of a sheet of paper, while other printing devices can only print on one side of a sheet of paper.

Printing devices can print data, such as image data, that is encoded in one or more formats. Examples of these formats include Kyocera Page Description Language (KPDL), Printing device Command Language (PCL), Portable Document Format (PDF), a generic Page Description Language (PDL), and PostScript. Other formats are possible as well. Some computing devices process data encoded in one or more of these formats.

SUMMARY

In an aspect, a method is provided. A computing device receives an encoder-input data stream encoded in an encoder-input format. The computing device reformats the encoder-input data stream into an encoder-output data stream encoded in an encoder-output format, where the encoder-input format differs from the encoder-output format. The encoder-output data stream includes a page table for one or more pages in the encoder-output data stream, one or more resources of the one or more pages in the encoder-output data stream, and one or more commands related to the one or more resources. The one or more commands are in a binary format. The page table includes references to the one or more pages of the encoder-output data stream. The one or more resources including one or more reusable resources that are used multiple times in the encoder-output data stream. The encoder-output data stream is based on a resource table storing entries for each of the one or more reusable resources, where each of the one or more reusable resources is stored only once in the encoder-output data stream, and where the one or more resources are stored in first-come, first-served fashion in the encoder-output data stream. The computing device generates an output that is based on the encoder-output data stream.

In an aspect, a computing device is provided. The computing device includes one or more processors and data storage. The data storage is configured to store at least computer-readable instructions that, when executed by the one or more processors, cause the computing device to perform tasks. The tasks include: receiving an encoder-input data stream encoded in an encoder-input format; reformatting the encoder-input data stream into an encoder-output data stream encoded in an encoder-output format, the encoder-output data stream including a page table for one or more pages in the encoder-output data stream, one or more resources of the one or more pages in the encoder-output data stream, and one or more commands related to the one or more resources, the one or more commands in a binary format, the page table including references to the one or more pages of the encoder-output data stream, the one or more resources including one or more reusable resources that are used multiple times in the encoder-output data stream, where the encoder-input format differs from the encoder-output format, where the encoder-output data stream is based on a resource table storing entries for each of the one or more reusable resources, where each of the one or more reusable resources is stored only once in the encoder-output data stream, and where the one or more resources are stored in first-come, first-served fashion in the encoder-output data stream; and generating an output that is based on the encoder-output data stream.

In an aspect, a printing device is provided. The printing device includes one or more processors and data storage. The data storage is configured to store at least computer-readable instructions that, when executed by the one or more processors, cause the printing device to perform tasks. The tasks include: receiving an encoder-input data stream encoded in an encoder-input format; reformatting the encoder-input data stream into an encoder-output data stream encoded in an encoder-output format, the encoder-output data stream including a page table for one or more pages in the encoder-output data stream, one or more resources of the one or more pages in the encoder-output data stream, and one or more commands related to the one or more resources, the one or more commands in a binary format, the page table including references to the one or more pages of the encoder-output data stream, the one or more resources including one or more reusable resources that are used multiple times in the encoder-output data stream, where the encoder-input format differs from the encoder-output format, where the encoder-output data stream is based on a resource table storing entries for each of the one or more reusable resources, where each of the one or more reusable resources is stored only once in the encoder-output data stream, and where the one or more resources are stored in first-come, first-served fashion in the encoder-output data stream; and generating an output that is based on the encoder-output data stream.

In an aspect, an article of manufacture is provided. The article of manufacture includes non-transitory data storage storing at least computer-readable instructions that, when executed by one or more processors of a computing device, cause the computing device to perform tasks. The tasks include: receiving an encoder-input data stream encoded in an encoder-input format; reformatting the encoder-input data stream into an encoder-output data stream encoded in an encoder-output format, the encoder-output data stream including a page table for one or more pages in the encoder-output data stream, one or more resources of the one or more pages in the encoder-output data stream, and one or more commands related to the one or more resources, the one or more commands in a binary format, the page table including references to the one or more pages of the encoder-output data stream, the one or more resources including one or more reusable resources that are used multiple times in the encoder-output data stream, where the encoder-input format differs from the encoder-output format, where the encoder-output data stream is based on a resource table storing entries for each of the one or more reusable resources, where each of the one or more reusable resources is stored only once in the encoder-output data stream, and where the one or more resources are stored in first-come, first-served fashion in the encoder-output data stream;

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 13 shows a flowchart for a method of encoding a data stream, according to example embodiments.

FIG. 14 shows a flowchart for a method of decoding a data stream, according to example embodiments.

DETAILED DESCRIPTION

Figure 1:
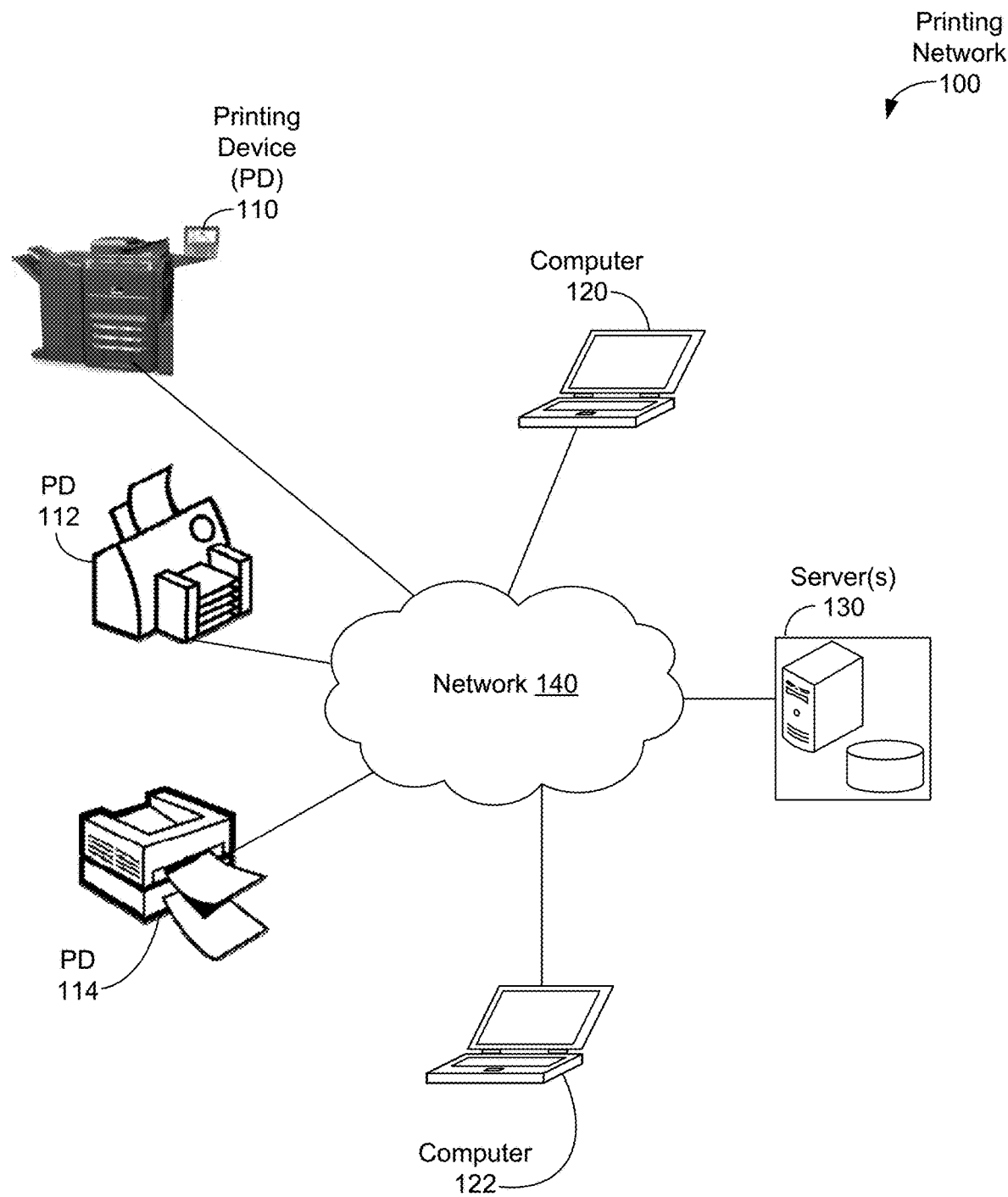
FIG. 1 is a diagram of a printing network, according to example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A print job for printing a document or other information can be specified using a particular format. The term "page description language" (PDL) is used to describe a language for formatting print jobs. Example PDLs include, but are not limited to, Printer Command Language 5 (PCL5), Printer Command Language 6 (PCL6), Printer Command Language XL (PCL XL), XML Paper Specification (XPS), Adobe® PostScript, Adobe® Portable Document Format (PDF), and Personalized Print Markup Language (PPML).

A PDL print job can include one or more files and/or other data-storage entities that store instructions and data to describe the layout or appearance of one or more pages to be printed. The page(s) can be printed to paper using a printing device, to a file, to a display and/or to other output devices. The PDL print job can be parsed and interpreted by a consumer application; e.g., a viewer application for viewing, raster image processor (RIP) firmware for printing to paper. An underlying concept for PDL can be a page; e.g., data and instructions can be specified in terms of a page. In some examples, all of the data used to print the page(s) contained in the PDL print job.

For example, the PDF PDL is based on PostScript, which is a programmable scripting language. In PDF, there are objects and resources that are shared among pages, and drawing commands in one page may refer to resources that exist or defined in prior or later pages, depending on how the PDF file has been created. Sharing objects between pages and referring to later-defined resources are features of other PDLs as well (e.g., XPS, PPML, PCLXL).

Due to the ordering or arrangement of objects and/or resources specified by a PDL, processing through printing device RIP firmware can be slowed. For example, PDF files must be processed top-to-bottom, especially if it is not a linearized PDF file, in order to retrieve resources needed in the drawing commands. That is, a PDF file may have to be fully loaded into transient storage (e.g., random access memory (RAM)) or saved in persistent storage (e.g., a hard drive, a flash drive) and be accessible using file I/O operations before it can be displayed or printed.

Another issue is that PDL print jobs cannot be printed using printing devices and/or computing devices where there is contention in memory resources among various applications and/or print jobs. For example, some devices have relatively-small amounts of memory and, due to a lack of memory, are often unable to print large print jobs. When such problems are met, either the PDF files cannot be printed and an error message is informed to the user, or severe delays in printing may be experienced.

Another problem in existing PDLs is that pages are inter-dependent. Pages may need resources in prior or later pages. At the minimum, such as for linearized PDF, the linearized page, say, page 1, must be loaded completely into memory or accessible on the disk for processing. The ordering or arrangement of objects and/or resources can lead to slow performance when processing complex PDL files. In some examples, the ordering or arrangement of objects and/or resources in document pages specified by a PDL reduces or completely inhibits parallel processing for either printing or viewing.

A further problem with current PDL formats is that these PDL formats are not designed to enable parallelism. There have been advances in multi-core processors in both computers, desktops and portable computing devices, and also in printing devices, multi-function devices, and imaging devices in general. There are advancements in the use of multi-RIP firmware, multi-ASIC circuit boards, and multi-memory architectures in the imaging devices and in computing devices, but none of which have effectively leveraged these advances in technology for the processing of documents, files, and print jobs. For example, the printing device hardware can have a system design with multiple integrated systems-on-chips (SoCs), each having a circuit board with one or more field programmable gated arrays (FPGAs), application specific integrated circuits (ASICs), RAM chips, etc. Each SoC can host an instance of RIP firmware that can operate independently of any other SoCs.

To address at least these problems with current PDL, herein is described a Smart Document Format (SDF) that can be used as a PDL. SDF can utilize binary-formatted commands (or "binary commands" for short); or more, generally, numerically formatted commands (or "numerical commands" for short). In contrast, other PDLs often use text-formatted commands.

Binary-formatted/numerically-formatted commands typically take less space than text-formatted commands. Thus, the use of binary-formatted/numerically-formatted SDF commands can make data streams formatted using SDF smaller than data streams formatted using a PDL that utilizes text-formatted commands. Also, in some examples, parsing of binary-formatted/numerically-formatted SDF commands can be simpler and more efficient than parsing text-formatted commands, and so processing of SDF-formatted data streams can be faster and more efficient than data streams formatted using other PDLs that have text-formatted commands. In some examples, specialized hardware can be utilized to speed process the herein-described binary (or numerical) commands.

The term "data stream" is used herein to describe a sequence of digitally encoded signals that may be stored in persistent and/or transient storage; e.g., a data stream can include one or more print jobs, files, documents, data packets, and/or other storage entities. Part or all of a data stream can be formatted using a PDL; e.g., a SDF data stream can be partially or completely formatted using the herein-described SDF PDL.

To reduce interdependence between pages in a SDF data stream, all resource data or definitions are stored in SDF in a first-come, first-served (FCFS) basis. That is, resource data is stored on a first page that uses the resource data; e.g., if a resource R1 is referenced or used in page 1, the resource definition and related data is stored on page 1, but if R1 is first referenced or used in page 10, the resource definition and related data is stored on page 10. Storing references on an FCFS basis allows for processing of an SDF file or print job without forward references. Such forward references can cause delays in processing a current page until the resource becomes available in a later page and/or can result in allocating storage for pages that are buffered while awaiting data for a forward-referred resource. Additionally, resources that are going to be re-used in later pages can be kept and cached in-memory or some accessible storage. If such accessible storage is unavailable at a printing or computing device, the SDF contemplates use of an external caching system (ECS) for storing at least resource data.

A herein-described SDF encoder can convert a data stream using a non-SDF format to an SDF data stream, enabling savings in file space based on the smaller SDF file sizes.

In devices with more transient and/or persistent storage and/or multiple processors, integrated support for SDF files can involve the use of encoder and/or decoder processing. An SDF decoder can provide features and services that enable such devices to perform parallel processing of SDF data streams.

In printing devices, multi-function printers (MFPs), production printing devices and/or other imaging devices with multiple processors, multiple cores and/or other support for parallel printing and/or display, the SDF contemplates parallel and/or asynchronous processing on at least a page-by-page basis. Parallel and/or asynchronous processing can speed printing and/or display of SDF-formatted data streams (or "SDF data streams", for short), thereby improving user experience and productivity.

The SDF is an improved PDL that enables more efficient processing of PDLs during printing and/or display of documents represented by SDF data streams and allows taking advantage of available processing power and SoC support in new printing device hardware designs, thereby reducing wait-times and delays in printing and/or display of these documents. Also, the SDF arranges document data and packages the resources to achieve efficient processing, printing or viewing of the pages; thus, the SDF can be utilized on computing and printing devices with relatively-small amounts of memory. Thus, the SDF can provide better performance for document printing and/or display over current PDLs on a wide variety of computing and printing devices.

Support for processing SDF files in printing device drivers and in RIP firmware enables processing of large data streams, even on relatively modest devices, thus giving users more options to process their documents and enabling printing of more data streams and fewer error pages. Further, device owners can better utilize and prolong the life of their devices using SDF.

Printing System Examples

FIG. 1 is a diagram illustrating printing network 100, according to example embodiments. Printing network 100 includes printing devices (PDs) 110, 112, 114, computers 120, 122, and one or more servers 130, all interconnected using network 140. In some examples, printing network 100 can have more, fewer, and/or different types of computing devices, servers, and/or printing devices than indicated in FIG. 1.

Printing devices 110, 112, 114 can include devices configured to scan, print, copy, e-mail, account for, communicate and/or otherwise process documents and/or files that are originally available either on paper or electronically. After processing by one or more of printing devices 110, 112, 114, the documents and/or files can be subsequently available either on paper or electronically, as requested. That is, printing devices 110, 112, 114 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 110, 112, 114 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 110, 112, 114 can perform other tasks and/or other processing as well. Printing devices 110, 112, 114 can include products from various manufacturers with variations in color, speed, computing power, functionality, network connectivity, and/or other features.

In example embodiments, some or all printing devices 110, 112, 114 can be connected to network 140 through one or more, possibly different, network protocols. Data can be transmitted between printing devices 110, 112, 114, computers 120, 122, and server(s) 130 over wired and/or wireless links between computers, computing devices, printing devices, servers and network 140. The format of each respective data transmission between devices in printing network 100 can include, but is not limited to, one or more of: PDLs (e.g., PCL5, PCL6, PCL XL, XPS, Kyocera Page Description Language (KPDL™), Private Communications Technology (PCT), Adobe® PostScript, Adobe® Page Description Format (PDF), PPML, text formats, image formats, File Transfer Protocol (FTP), HyperText Transfer Protocol (HTTP), Java Message Service (JMS), Simple Object Access Protocol (SOAP), Short Message Service (SMS), Simple Message Transfer Protocol (SMTP), Simple Network Maintenance Protocol (SNMP), Transfer Control Protocol/Internet Protocol (TCP/IP), User Datagram Protocol (UDP), Lightweight Directory Access Protocol (LDAP), Message Queue (MQ), and/or other protocols), extensible mark-up language (XML), database tables, and/or flat file formats.

Communications between the computers, computing devices, servers, and printing devices can include: computers 120, 122, and/or server(s) 130 sending data for print jobs and/or print job portions for printing to printing devices 110, 112, 114 and printing devices 110, 112, 114 sending alert, status, error, device information, colorant-usage information, maintenance-event information, and/or other messages to computers 120, 122, and/or server(s) 130 to inform other devices about colorant-usage, maintenance, error, and/or other conditions of the printing devices; e.g., idle, printing, sleeping, paper jam, low or out of paper, low or out of toner/ink, etc. Other communications between computers 120, 122, and/or server(s) 130 are possible as well, such as, but not limited to, requests to render images using radial gradient coloring and related responses to the requests, are possible as well.

Computers 120, 122 can create, obtain, update, display, and/or delete data (and perhaps related software) for configurations of printing network 100. Example data for configurations of printing network 100, includes, but is not limited to: data for configuring devices in printing network 100; e.g., data for printing devices 110, 112, 114, data for configuring network protocols, access-management related data for clients and/or servers; (e.g., passwords, signatures, credentials, certificates, subscriptions, licenses, and/or tokens related to accessing part or all of the functionality of network 140 and/or cloud-based services, software and/or solutions) and data for customizing, configuring and managing applications on devices/servers of printing network 100.

In some embodiments, server(s) 130 can provide additional services as well (or instead), such as services related to some or all of the functionality for one or more document solutions and managed print services; e.g., encoder services, decoder services, encoder/decoder services, functionality for accounting and maintenance of solutions and services, functionality for document workflows, such as processing forms, hard-copy signatures, client authentication/access functions, user interface functionality, local and/or remote network based storage management involving devices in printing network 100.

For example, server(s) 130 can provide functionality related to a print server. A print server can process jobs (e.g., spool job-related data, route jobs, provide user and/or server-related accounting for jobs, verify/enforce authentication and authorization rules related to jobs) and store data related to printing devices of printing network 100. The jobs processed by a print server can include, but are not limited to, print jobs/printing requests, communicating documents, files, and/or related data (e.g., data in e-mails, SMS messages, etc.), document and file-related requests (e.g., creating, formatting, scanning, reformatting, converting, accessing, updating and/or deleting one or more documents and files), jobs for document workflow, and/or processing information about errors/complaints about the printing device (e.g., creating, reviewing, updating, assigning, reassigning, communicating, and/or deleting trouble tickets related to errors/complaints about printing (and perhaps other) devices 110, 112, 114. The data can include data used in processing jobs (e.g., spooled data for print jobs, files for file-related requests, etc.), access-management related data, primary identification characteristics and/or model-dependent information about printing devices served by server(s) 130 and perhaps other data.

As another example, server(s) 130 can provide functionality related to a network file server for communicating and/or storing files and/or other data using network 140; e.g., sending print jobs to be printed to one or more of printing devices 110, 112, 114, storing files provided by computers 120, 122, saving databases used by some or all of the devices connected to network 140, providing encoder/decoder services for SDF data streams. In some examples, one or more servers of server(s) 130 can provide functionality of both a print server and a network file server. In some examples, one or more servers of server(s) 130 can provide other server functionality; e.g., web server functionality for storing, communicating, and/or otherwise providing content as requested via the World Wide Web.

Figure 2:
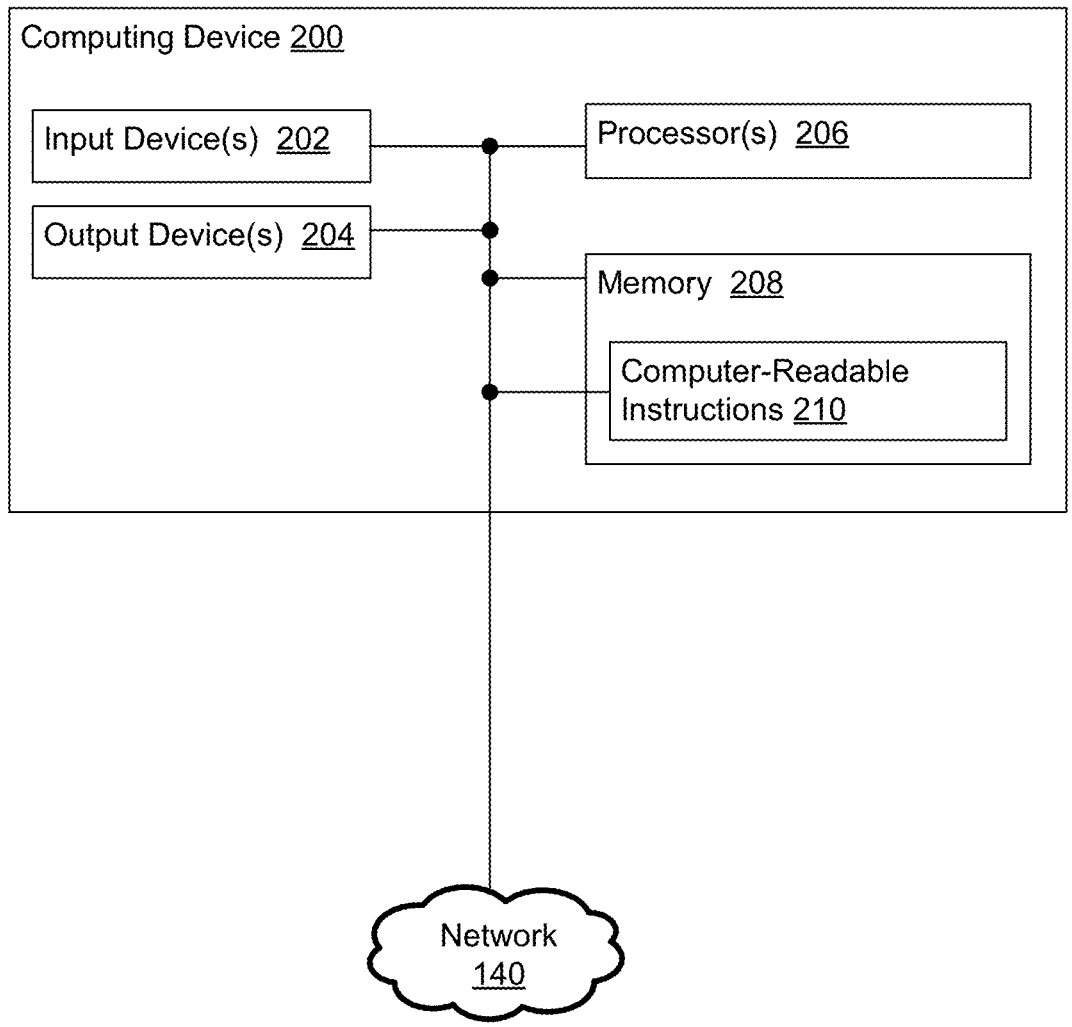
FIG. 2 is a block diagram illustrating a computing device, according to example embodiments.

FIG. 2 is a schematic block diagram illustrating computing device 200, according to example embodiments. Computing device 200 can include one or more input devices 202, one or more output devices 204, one or more processors 206, and memory 208.

Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network receivers and/or transceivers, such as a Bluetooth™ transceiver, a Zigbee® transceiver, a Wi-Fi™ transceiver, a WiMAX™ transceiver, a wireless wide-area network (WWAN) transceiver and/or other similar types of wireless transceivers configurable to communicate via a wireless network, such as wireless portions of network 140. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, Global Positioning System (GPS) sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a USB transceiver, or similar transceiver configurable to communicate via a twisted pair wire, a coaxial cable, a fiber-optic link, or a similar physical connection to a wireline network, such as wired portions of network 140, and/or wireless network transmitters and/or transceivers, such as a Bluetooth™ transceiver, a Zigbee® transceiver, a Wi-Fi™ transceiver, a WiMAX™ transceiver, a WWAN transceiver and/or other similar types of wireless transceivers configurable to communicate via a wireless network, such as wireless portions of network 140. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), raster image processors (RIPs) digital signal processors (DSPs), systems-on-chips (SoCs), field programmable gated arrays (FPGAs), application specific integrated circuits (ASICs), additional related circuitry/ processors, etc.). Processors 206 can be configured to execute computer-readable instructions 210 that are contained in memory 208 and/or other instructions as described herein.

Memory 208 can include one or more computer-readable storage media configured to store data and/or instructions that can be read and/or accessed by at least one of processors 206. The one or more computer-readable storage media can include one or more volatile and/or non-volatile storage components, such as optical, magnetic, organic or other memory or disc storage, which can be integrated in whole or in part with at least one of processors 206. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 208 can be implemented using a single physical device (e.g., one optical, magnetic, organic or other memory or disk storage unit), while in other embodiments, memory 208 can be implemented using two or more physical devices.

In particular, memory 208 can store computer-readable instructions 210 that, when executed by processor(s) 206, can cause a computing device to perform functions, such as but not limited to, some or all of at least the herein-described functionality of software, firmware, devices, networks, methods, diagrams, files, images, equations, and/or scenarios. Computing device 200 can be configured at least to perform at least part of the herein-described techniques related to the Smart Document Format and/or functionality related to one or more: data streams, SDF data streams, F1-formatted input, F1-formatted data streams, a non-linearized PDF data stream, a linearized PDF data stream, an encoder function, an encoder service, a decoder function, a decoder service, an encoder/decoder service, a print server, a network file server, a computing device, a computer, a printer, a printing device, printing devices 110, 112, 114, computers 120, 122, server(s) 130, F1 format 300, SDF 400, SDF 450, and/or methods 600, 1000, 1300, 1400. For example, computing device 200 can be configured to perform at least part of the herein-described techniques related to SDF and/or the functionality listed immediately above by executing some or all of computer-readable instructions 210 using processor(s) 206.

Techniques Involving the Smart Document Format

Figure 3:
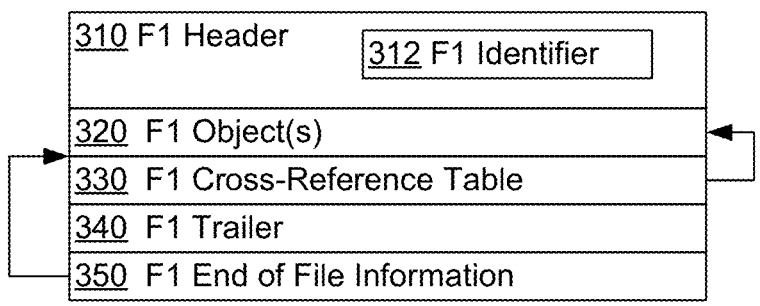
FIG. 3 is a block diagram illustrating an F1 format, according to example embodiments.

FIG. 3 is a block diagram illustrating F1 format 300, according to example embodiments. In some examples, F1 format 300 can be used as part or all of a PDL and/or can be used to format part or all of a data stream. In some examples, F1 format 300 can be a non-linearized PDF file format.

FIG. 3 shows that F1 format 300 includes F1 header 310, one or more F1 objects 320, F1 cross-reference table 330, F1 trailer 340, and F1 end of file information 350. F1 header 310 indicates that F1 format 300 is being used and includes F1 identifier 312. F1 identifier 312 can indicate the F1 file format and version. For example, F1 identifier 312 can be represented as "% PDF-x.y" where x is a major version, from 1 to 2, for example, and y is a minor version number, from 0 to 7, for example.

F1 object(s) 320 can include one or more objects used by the F1 file format. The object(s) can include, but are not limited to, one or more: null objects, Boolean objects, integer objects, real objects, name objects, string objects, array objects, dictionary objects, external objects, form external objects, group external objects, and/or reference external objects. A null object represents something missing from a data stream formatted using F1 format 300. A Boolean object, an integer object, and a real object respectively represent Boolean-valued, integer-valued, and real-valued data items. Name and string objects represent sequences of 8-bit bytes that can represent characters, where a name object represents a unique sequence of characters that can begin with a "/" character, and where a string object represents an arbitrary sequence of 0 or more 8-bit bytes. An array object is a collection of other objects enclosed in square brackets and separated by white space. A dictionary object is a collection of key-value pairs, where a key of a key-value pair can be a name, and where a value of the key-value pair can be an object. In practice, an object stored in a dictionary entry is intended to be referred to by the key.

An external object (also termed a "stream" object) is a graphics object whose contents are defined in a self-contained stream, separate from the content stream in which it is used; e.g., an image external object including a digital photograph or another image. A form external object can be an object including a self-contained description of an arbitrary sequence of graphics objects. A group external object can be an object including a group of objects. And, a reference external object can be an object including one or more references to other objects. Collectively, F1 object(s) 320 can be termed a "body" of a data stream formatted using F1 format 300.

F1 cross-reference table 330 can have one or more sections, where each section of F1 cross-reference table 330 stores locations of F1 object(s) 320 in the body of a data stream formatted using F1 format 300. More particularly, a section of F1 cross-reference table 330 can include a first object number referred to by the section of F1 cross-reference table 330 and a count of objects referred to by F1 cross-reference table 330. Then, F1 cross-reference table 330 can include a cross-reference table entry for each object referred to by F1 cross-reference table 330. A cross-reference table entry for an object can include a byte offset to the beginning of the object, an object generation value indicating the "generation" or version of the object (often 0 for valid objects or 65535 for invalid objects), and a free/use flag indicating whether the object is "free" or not used or "used" or actually used in a data stream formatted using F1 format 300. As such, FIG. 3 uses an arrow to show that F1 cross-reference table 330 refers to F1 object(s) 320 in the body of a data stream formatted using F1 format 300.

F1 trailer 340 can include a dictionary object that provides general information about a data stream formatted using F1 format 300; e.g., size information that indicates how many entries are in F1 cross-reference table 330. F1 end of file information 350 can include root information that locates the first cross-reference table in the document; e.g., a location of F1 cross-reference table 330. As such, FIG. 3 uses an arrow to show that F1 end of file information 350 refers to F1 cross-reference table 330.

Figure 4A:
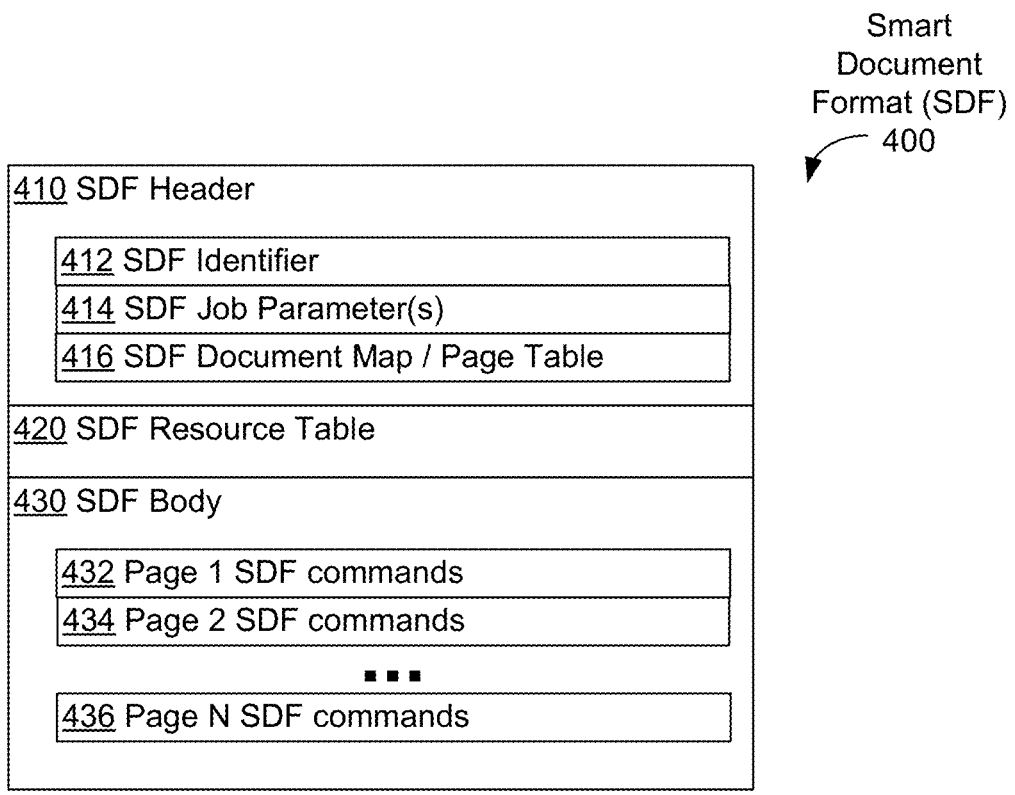
FIG. 4A is a block diagram illustrating a smart document format, according to example embodiments.

FIG. 4A is a block diagram illustrating smart document format (SDF) 400, according to example embodiments. In some examples, SDF 400 can be used as part or all of a PDL and/or can be used to format part or all of a data stream. When used as a PDL, SDF 400 is efficient, compact, and support current PDL features for color support, blending, transparency and portability, among others.

In data streams encoded using SDF 400, resources are stored in FCFS fashion; that is, a resource for a data stream is stored on the initial page of the data stream that uses the resource. Subsequent usage of the same resource will refer to the prior definition. Further, resources of a page are arranged in the order in which the resources are used in the page, and in the document (or entire data stream). For example, all resources referred to in drawing commands in page 1 are defined and stored ahead of resources not used in page 1. A resource not used in page 1 will be defined on the first page the resource is going to be used; e.g., on page 2 or a later page. If a resource is used on multiple pages, resource reference information can be maintained to indicate when the resource is or is not needed. If all resources are stored (e.g., cached), then data defining a resource will available at the time the resource is to be used, either from the data stream formatted using SDF 400 (the first usage) or from storage (subsequent usages). Thus, SDF 400 does not use forward references for resources, where a forward reference refers to data that is present later in a data stream formatted using SDF 400.

Storing resources in FCFS fashion allows for parallel rendering and/or other processing of pages in data streams encoded using SDF 400. Each computational instance (e.g., processor, core, thread, SoC) processing a page of a data stream encoded using SDF 400 can operate in parallel, assuming all instances have access to stored resources of the data stream that have already been processed.

The SDF can include and/or use category data for categorizing the one or more pages regarding parallel processing and memory allocation. The category data can include, but is not limited to, a color mode regarding color printing and/or display of a page, a transparency mode regarding utilization of transparent images on the page, a paper-size mode regarding a size of paper utilized to print the page, a media-type mode regarding a media type related to media utilized to print the page, a binding-edge related to a binding edge utilized to print the page, an image-weight value regarding a number of images present in the page, and a rendering-index value measuring complexity to render the page.

SDF 400 includes SDF header 410, SDF resource table 420, and SDF body 430. SDF header 410 includes SDF identifier 412, one or more SDF job parameters 414, and SDF document map/page table 416. SDF identifier 412 can include information that indicates that a data stream is SDF-compliant; i.e., identifies the data stream as an SDF data stream.

SDF job parameter(s) 414 includes data used to optimize processing for a data stream formatted using SDF 400. Examples of SDF job parameter(s) 414 include, but are not limited to, one or more parameters and/or other data for: a color mode (e.g., monochrome or color), a transparency mode (e.g., 0 for transparent, a value between 0 and 1 representing opacity, and 1 for opaque), a duplex mode (e.g., simplex or duplex printing), data about a binding edge, media type information, data for grouping pages as being similar for more efficient and/or parallel processing of a group of pages.

SDF document map/page table 416 can include one or more page/offset pairs, where a page of a page/offset pair is a page number of a page in the data stream, and an offset of a page/offset pair is an address or position in the data stream for an actual start of the page. The offset can be calculated from the beginning of the data stream or from some other location; e.g., the beginning of SDF body 430. An example page/offset pair can be "Page2:0x00230000" where a page "Page2" is at an offset of "0x00230000" from the beginning of the data stream. If a data stream formatted by SDF 400 has N pages, N>0, then SDF document map/page table 416 can have N page/offset pairs.

SDF resource table 420 can include a list, table, database, and/or other data structure for storing one or more entries related to resources in a data stream using SDF 400. For example, one entry in SDF resource table 420 can include a resource identifier for a resource, an offset within the data stream to the resource, and resource reference information (RRI) for the resource. Example resource reference information can include, but is not limited to, a reference count for the resource and/or a list of pages where the resource is used, where a reference count initially indicates how many times the resource is used in the data stream. In some examples, the reference count has a default value of 1. The list of pages where the resource is used can identify the pages that would make use or that would refer to the resource being defined. In some examples, the list of pages where the resource is used can be optionally provided as an array of pages; i.e., as part of SDF resource table 420 for SDF 400 or in parameter field data of SDF commands for SDF 450 as discussed below. In some examples, SDF 400 and/or SDF 450 can require use of the resource count field. In examples where a reference is only used once, the reference count and/or the list of pages where the resource is used for SDF 400 and/or SDF 450 can be omitted or assigned zero/NULL values.

For example, suppose a resource RRI1 is used four times in a data stream on pages 1, 3, 25, and 51. Then, the resource reference information for resource RIM can include a referenced count equal to 4 (four) and a list of pages where the resource is used of [1, 3, 25, 51]. Other examples are possible as well. Then, the reference count can be decremented by one each time the resource is used, and the resource can be removed from storage once the reference count reaches zero. That is, as the data stream is processed, reference RRI1 can be stored after being found on page 1 and the reference count can be decremented from 4 to 3 by the time page 1 is completely processed. Then, by the time page 3 is completely processed, reference RRI1 can be retrieved from storage, used on page 3, and the reference count for RRI1 can be decremented from 3 to 2. By the time page 25 is completely processed, reference RRI1 can be retrieved from storage, used on page 25, and the reference count for RRI1 can be decremented from 2 to 1. And, by the time page 51 is completely processed, reference RRI1 can be retrieved from storage, used on page 51, the reference count for RRI1 can be decremented from 1 to 0, and reference RRI1 can be deallocated and/or removed from storage.

In some examples, a resource only used once in a data stream using SDF 400 will not have an entry in SDF resource table 420. That is, in these examples, SDF resource table 420 is only used for resources that are used at least twice throughout the data stream using SDF 400.

SDF body 430 includes page 1 SDF commands 432, page 2 SDF commands 434 . . . and page N SDF commands 436, where N is an integer. The example depicted in FIG. 4A assumes N>2; that is, that at least three pages are in the data stream formatted using SDF 400. In other examples where N=1, SDF body 430 includes only page 1 SDF commands 432; and in other examples where N=2, SDF body 430 includes only page 1 SDF commands 432 and page 1 SDF commands 434.

For efficiency, SDF 400 and SDF 450 can employ binary (or more generally, numerical) codes for all drawing, configuration and resource definitions in a page. The binary (or numerical) codes are collectively termed as "SDF commands" herein. For example, each command of page 1 SDF commands 432, page 2 SDF commands 434 . . . page N SDF commands 436, page 1 SDF commands with resource reference information 472, page 2 SDF commands with resource reference information 474 . . . page N SDF commands with resource reference information 476 can be an SDF command.

An SDF command can have the following format:
command_id[size][parameters]
where:
command_id is a field storing a binary/numerical code that identifies the command; e.g., identifies a command as a configuration command, a drawing command, a resource definition command, etc.;
size is a field specifying the length, in bytes, of the following parameters field—if the SDF command does not have any parameters, the size field can be set to zero (0); and
parameters is a field providing binary/numerically-encoded data for executing the command; e.g. data such as dimensions, coordinate positions, font names, color space references, references to other resources, etc.

In some examples, the parameters field of an SDF command can include one or more data structures and/or arrangements of data used by the command. For example, if the command field is for defining a color space, the parameters field can include data for defining a color space, including color IDs, white points, ICC profile data, etc. Other formats for SDF commands are possible as well.

As indicated above, page 1 SDF commands 432, page 2 SDF commands 434 . . . page N SDF commands 436 of SDF body 430 can include drawing commands. Drawing commands can vary in purpose and use. Some drawing commands are actual drawing actions (moveto, lineto, path, fill) or resource definitions.

As an example, a color space definition command can have the following format:
123 [1024] [binarydata]
where:
"123" is a binary/numerical code for a color space definition command;
"1024" is a size in bytes of "binarydata", and
"binarydata" represents parameter data defining the color space.

Other examples of SDF commands are possible as well.

Figure 4B:
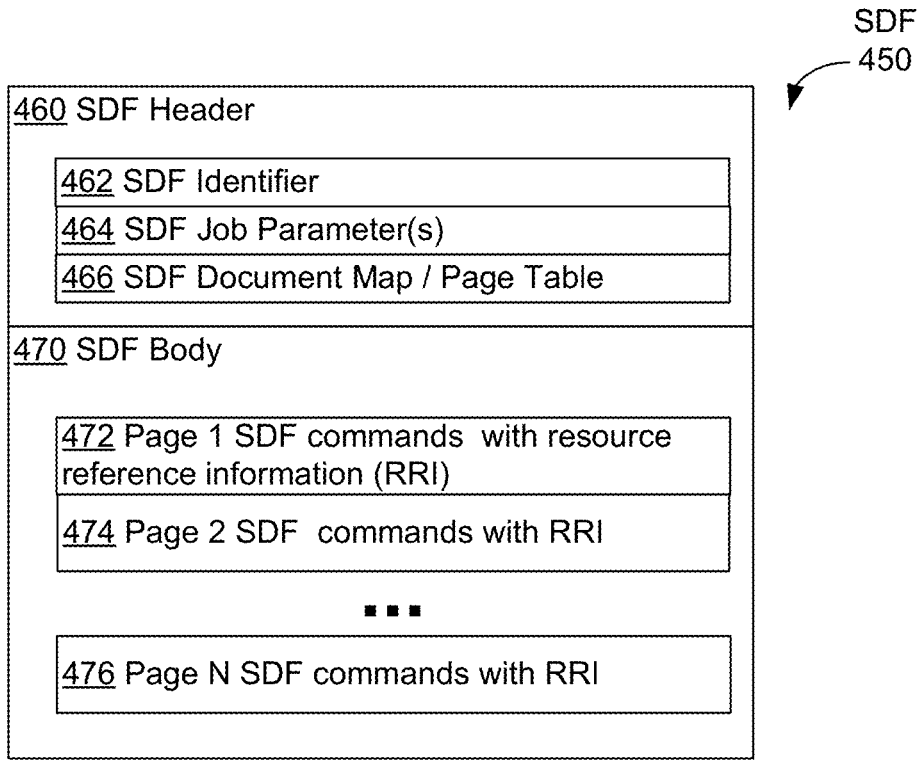
FIG. 4B is a block diagram illustrating a variation of the format illustrated by FIG. 4A, according to example embodiments.

FIG. 4B is a block diagram illustrating SDF 450, which is a variation of SDF 400, according to example embodiments. In some examples, SDF 450 can be used as part or all of a PDL and/or can be used to format part or all of a data stream.

SDF 450 includes SDF header 460 and SDF body 470. SDF header 460 includes SDF identifier 462, one or more SDF job parameters 464, and SDF document map/page table 466. Each of SDF identifier 462, one or more SDF job parameters 464, and SDF document map/page table 466 of SDF 450 can have the same data and perform the same functionality of corresponding SDF identifier 412, one or more SDF job parameters 414, and SDF document map/page table 416 of SDF 400.

SDF body 470 includes page 1 SDF commands with resource reference information 472, page 2 SDF commands with resource reference information 474 . . . and page N SDF commands with resource reference information 476, where N is an integer. The example depicted in FIG. 4B assumes N>2; that is, that at least three pages are in the data stream formatted using SDF 450. In other examples where N=1, SDF body 470 includes only page 1 SDF commands with resource reference information 472; and in other examples where N=2, SDF body 470 includes only page 1 SDF commands with resource reference information 472 and page 2 SDF commands with resource reference information 474.

SDF 450 is a variation of SDF 400. While SDF 400 has a resource table (SDF resource table 420 of FIG. 4A), SDF 450 does not have a resource table as can be seen in FIG. 4B. Rather, for SDF 450, parameter fields of SDF commands in SDF body 470 can store resource reference information, such as resource reference information discussed above in the context of SDF resource table 420. That is, SDF 400 stores resource reference information in SDF resource table 420, while SDF 450 stores resource reference information at the location where each resource is actually defined within the body of the page that makes first use of the resource.

In SDF 450, a "reusable resource" or resource used on multiple pages can be defined using the following syntax
resource_id[size][binarydata]
where:
"resource_id" is an identifier for the reusable resource; e.g., a binary or other numerical code identifying the reusable resource,
"size" is a size in bytes of "binarydata", and
"binarydata" represents parameter data defining the reusable resource and can include resource reference information for the reusable resource.

Other examples of SDF commands are possible as well.

For example, suppose that page 1 of a data stream DS400A1 formatted using SDF 400 includes a command CMD1 that first uses a resource RRI2 and that RRI2 is used on pages 1 and 2 of the data stream. Then, SDF resource table 420 for data stream DS400A1 can have an entry for resource RRI2 with a reference count=2, and perhaps a list of pages where RRI2 is used=[1, 2]. Then, suppose that the same data is formatted using SDF 450 as data stream DS450A1, and that a command CMD1 is the first use of RRI2 on page 1. Then, the parameter field for CMD1 would include a reference count for RRI2=2 and perhaps a list of pages where RRI2 is used=[1, 2]. A command CMD2 that also uses RRI2 on page 2 of data stream DS450A1 would not have the resource reference information included with CMD1. Other examples are possible as well.

Table 1 below compares F1 format 300 and SDFs 400 and 450 to provide an appreciation of how SDF 400 stores document data and packages resources to achieve efficient processing, printing or viewing of pages in a data stream.

TABLE 1

| F1 Format 300 | SDF 400 and SDF 450 |
|---|---|
| Resources used for drawing commands may be defined anywhere in a data stream, when the data stream itself is not linearized. If the data stream is linearized, the resources may or may not be defined where the page references them. | All resource data or definitions will be stored in on the first page that uses the resource. That is, resources are stored in FCFS fashion. Resources in SDF 400 formatted data streams and SDF 450 formatted data streams can also be thought of as "first-in, first-saved" or "first-in, first-out" arrangement, as the ones that are to be used first in the page are stored first. This implies that pages can be processed completely without relying on later pages. Each page in an SDF 400 formatted data stream or in an SDF 450 formatted data stream contains the resources needed to render the page. Further, resources that are going to be used in later pages can be stored. Both SDF 400 and SDF 450 utilize resource reference information to track resources used in multiple pages. This allows for later pages to contain less data, and still can be processed completely. Also, FCFS storage of resources enables SDF 400 and SDF 450 to dispense with forward references of resources. Thus, both SDF 400 formatted data streams and SDF 450 formatted data streams are fully linearized. |
| As the cross-reference table is at the end of a data stream formatted using F1 format 300 and resources can be provided in any order, the entire data stream must be available to retrieve the resources during processing or rendering of the pages of the data stream. | SDF 400 formatted data streams and SDF 450 formatted data streams can be processed in FCFS order and so the entire data stream need not be available, as long as resources used on later pages are cached and/or otherwise stored. |
| Data streams formatted using F1 format 300 include text-formatted commands that use a script-like syntax. | SDF 400 and SDF 450 both use binary/numerically formatted commands. A data stream formatted using either SDF 400 or SDF 450 is expected to be smaller than a data stream formatted F1 format 300 (with text-formatted commands). |

SDF 400 and SDF 450 can be associated with encoder and decoder software. Encoder software for SDF 400 and SDF 450 (or "SDF encoder software" for short) can embody an encoder function that is configured to convert a PDL-formatted data stream (e.g., a data stream formatted using F1 format 300) to a data stream formatted using either SDF 400 or SDF 450. The encoder software can be integrated in other software, such as a printing device driver. In the case of encoder software integrated a printing device driver, the printing device driver can use the encoder software to produce a data stream formatted using either SDF 400 or SDF 450 instead of a PDF data stream.

Decoder software for SDF 400 and SDF 450 (or "SDF decoder software" for short) can embody a decoder function that is configured to parse a data stream formatted using either SDF 400 or SDF 450 for display, printing, communication, and/or storage as formatted output. The decoder software can be integrated in other software, such as printing device firmware, a web browser, document viewer or document editor, perhaps as a plug-in. In some examples, the SDF encoder software and the SDF decoder software can be combined into SDF encoder/decoder software that can be used to embody both the herein-described encoder function and the herein-described decoder function.

In operation, PDL-formatted data streams that are created in mobile devices, computers, print servers or file servers can be encoded the SDF encoder software into SDF 400 or SDF 450 format. In some examples, the SDF encoder software can be part of other software; e.g., printing device drivers, application plug-ins, and system services, to enable imaging, printing, and/or computing devices, including mobile devices to encode data streams into SDF 400 or SDF 450 format. An example of an imaging, printing, and/or computing device can be computing device 200 discussed herein. In some examples, the SDF decoder software can be part of printing device (or other device) software and/or firmware; e.g., RIP firmware of a printing device. Alternatively, the RIP firmware can use and/or integrate an SDF interpreter to directly parse and interpret data streams formatted using SDF 400 or SDF 450.

Figure 5:
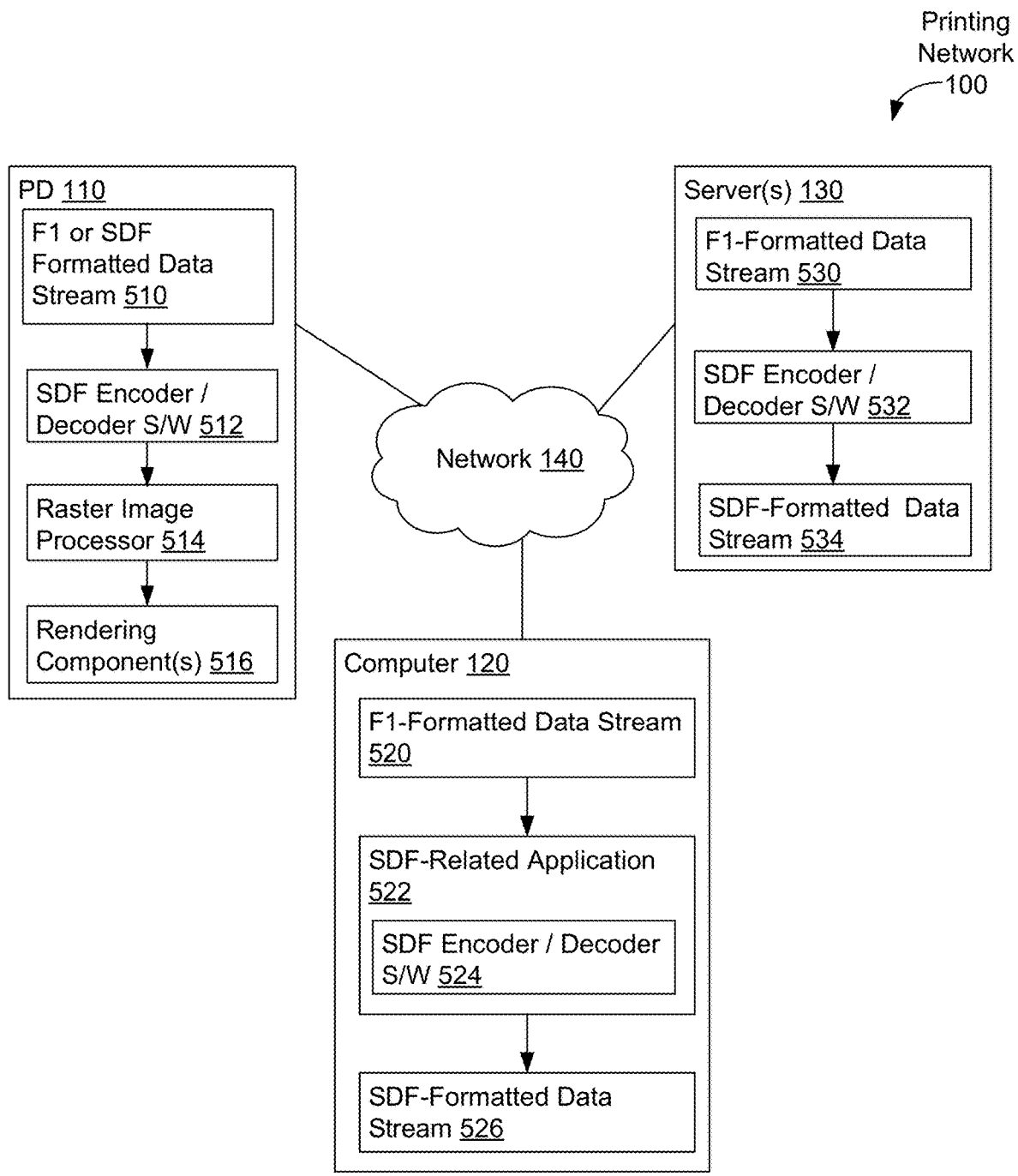
FIG. 5 is a diagram of a portion of the printing network of FIG. 1, according to example embodiments.
Figure 6:
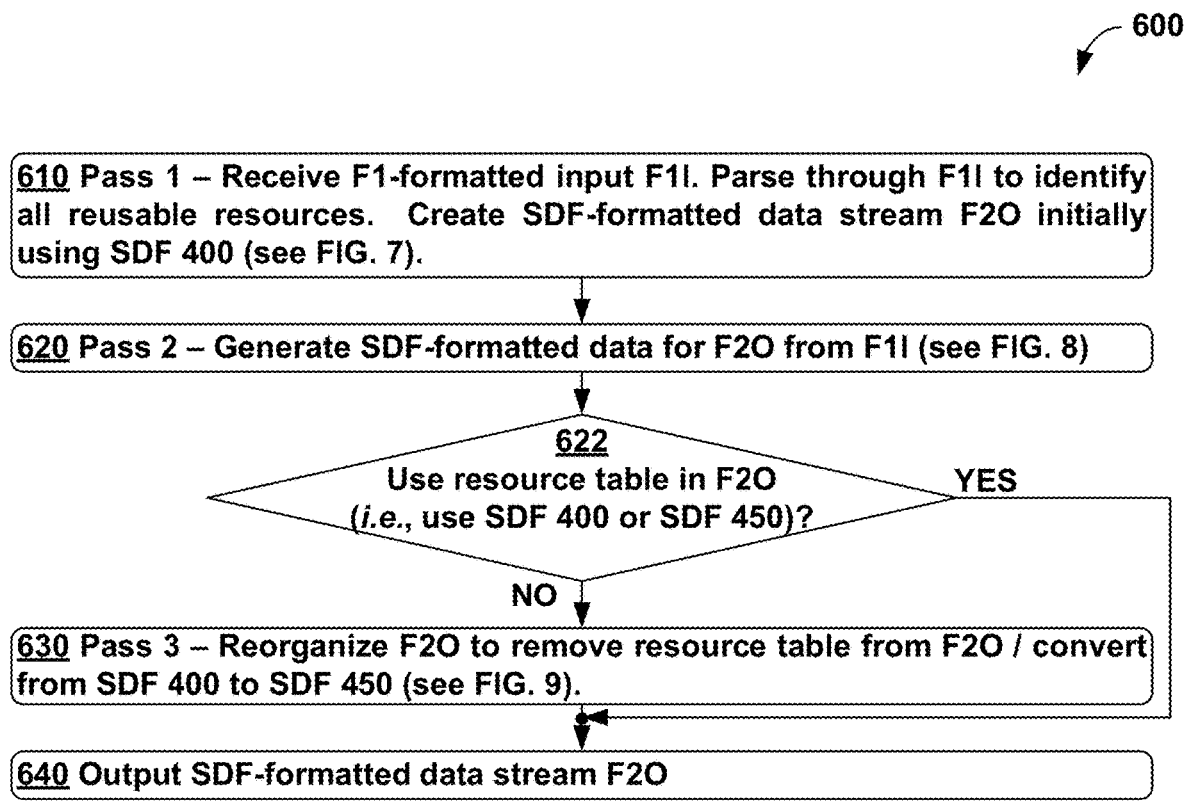
FIGS. 6, 7, 8, and 9 show flowcharts for a method for converting an input data stream formatted using the format of FIG. 3 to an output data stream formatted using the format of either FIG. 4A or FIG. 4B, according to example embodiments.

FIG. 5 is a diagram of a portion of printing network 100, according to example embodiments. In particular, FIG. 5 shows printing device 110, computer 120, and server(s) 130 connected by network 140. In other examples, printing network 100 can include more, fewer, and/or different printing devices, computers, servers, and/or other devices than shown in FIG. 1 and/or FIG. 5.

FIG. 5 shows that printing device 110 includes F1 or SDF formatted data stream 510, SDF encoder/decoder software (S/W) 512, raster image processor 514, and one or more rendering components 516, that computer 120 includes F1-formatted data stream 520, SDF-related application 522 having SDF encoder/decoder software 524, and F1 or SDF formatted data stream 510; and that server(s) 130 includes F1-formatted data stream 530, SDF encoder/decoder software 532, and SDF-formatted data stream 534. Each of data streams 510, 520, 526, 530, 534 can be a data stream of information formatted using one format; e.g., either the herein-described F1 format 300 (or "F1 format" for short), the herein-described SDF 400, or the herein-described SDF 450 as mentioned above. In describing FIG. 5, an SDF-formatted data stream, a SDF-related application, and SDF encoder/decoder software can use either SDF 400 or SDF 450, unless explicitly specified otherwise.

Each of SDF encoder/decoder software 512, 524, 532 can embody a herein-described encoder function to encode (or formatting) a data stream formatted in the F1 format to a data stream formatted in an SDF format. And, each of SDF encoder/decoder software 512, 524, 532 can also embody a herein-described decoder function to decode a data stream formatted in an SDF format to generate an output as specified by the SDF format. As such, some or all of SDF encoder/decoder software 512, 524, 532 can be part or all of a software application configured at least to encode data from the F1 format to an SDF format. In some of these examples, some or all of SDF encoder/decoder software 512, 524, 532 can be a plug-in of a software application that supports encoding data into an SDF format. In some of these examples, some or all of SDF encoder/decoder software 512, 524, 532 can be part or all of a software application configured at least to encode data from the F1 format to an SDF format. Also, SDF encoder/decoder software 524 is shown in FIG. 5 as being part of SDF-related application 522. In some examples, SDF encoder/decoder software 524 can be a plug-in of SDF-related application 522 that supports decoding data that was previously encoded in an SDF format.

FIG. 5 shows that printing device 110 can receive F1 or SDF formatted data stream 510 and use SDF encoder/decoder software 512 to convert F1 or SDF formatted data stream 510 to a format (e.g., F1 format 300, SDF 400, SDF 450) that raster image processor 514 and/or rendering component(s) 516 can use to print the data of F1 or SDF formatted data stream 510 to paper. In other examples, printing device 110 can receive F1 or SDF formatted data stream 510 and use SDF encoder/decoder software 512 to convert F1 or SDF formatted data stream 510 to another format (e.g., convert an F1-formatted data stream to an SDF-formatted data stream), and store, communicate, display and/or otherwise provide the converted data stream.

FIG. 5 shows that computer 120 can receive F1-formatted data stream 520 and use SDF-related application 522 (perhaps including use of SDF encoder/decoder software 524) to convert F1-formatted data stream 520 to SDF-formatted data stream 526. Once created, computer 120 can store, communicate, display and/or otherwise provide SDF-formatted data stream 526. In some examples, computer 120 can generate a print job that includes SDF-formatted data stream 526 and provide the print job to a printing device in printing network 100 (e.g., printing device 110) so that the printing device can render SDF-formatted data stream 526 to paper or another medium.

FIG. 5 shows that server(s) 130 can receive F1-formatted data stream 530 and convert F1-formatted data stream 530 into SDF-formatted data stream 534 using SDF encoder/decoder software 532. In some examples, server(s) 130 can generate a print job that includes SDF-formatted data stream 534 and provide the print job to a printing device in printing network 100 (e.g., printing device 110) so that the printing device can render SDF-formatted data stream 534 to paper or another medium.

In some examples, SDF-related application 522 can be a web browser application, a document review and/or editing application, a printing device driver, or another software application. In some examples, server(s) 130 can include a network file server, a print server, or another server (e.g., a web server) that uses SDF encoder/decoder software 532 to convert data streams between formats upon receipt of an explicit request for file conversion (e.g., a request to convert a file to an SDF format) or implicitly (e.g., conversion of a subset of a non-linearized PDF file in F1 format 300 to a data stream in an SDF format as part of a policy to reduce bandwidth).

Both SDF 400 and SDF 450 include equivalent commands to commands in other PDLs at least for: (i) setting up print jobs, pages, and/or buffers; (ii) configuring pages, scaling, layout, transparency, colors, pens, and/or other data; (iii) defining functions, macros, objects, and/or others; and (iv) rendering/printing/displaying data on a page, screen, data stream, and/or other medium. For example, a "Do" operator in F1 format 300 can be a SDF 400 and SDF 450 command with numerical code 20. This conversion and mapping of text-formatted commands of other PDLs to binary/numerical codes can reduce the number of current PDL commands.

Both SDF 400 and SDF 450 can support capabilities and features such as color spaces, particularly those that make use of International Color Consortium (ICC) profiles, and transparency, among others. SDF 400 and SDF 450 can optimize some sequences of commands. For example, a series of "moveto" and "lineto" commands in other PDLs can be translated to a single "Path" command for SDF 400 and SDF 450, which can have all the coordinate parameters from the series of moveto and lineto commands. Optimizing sequences of commands can achieve a more optimized and compact data for SDF 400 and SDF 450 formatted data streams. In some examples, SDF 400 and SDF 450 can support capabilities such as enhanced blending features, finishing features, and use of new color spaces.

Both SDF 400 and SDF 450 have a concept of "grouped pages", which are two or more pages having the same or similar configurations. The two or more pages having the same or similar configurations can be bundled together as a set of pages that can be processed as a group of grouped pages. In some data streams, there can be zero groups of grouped pages. In some data streams, there can be one group of grouped pages. In other data streams, there can be multiple groups of grouped pages. Also, even if there are one or more groups of grouped pages in a data stream, the data stream can include pages that are not in any group(s) of grouped pages. One or more groups of grouped pages can be distributed for efficient processing of the entire data stream. For example, monochrome pages can be processed through monochrome processing and color pages can be processed through color processing. Further, it is possible to distribute the processing of monochrome pages to monochrome imaging devices and color pages to color imaging devices.

Another example is the processing of transparent pages. Transparent pages can be processed through RIP firmware with transparent support, and non-transparent pages processed optimally through a different pipeline. In a multiprocessor or multi-core system, the processing of such pages can be distributed and performed in parallel. Similar parallel processing can be performed for pages grouped based on other criteria such as duplex settings, media types, binding edges, paper sizes and so on.

A grading system can be implemented in SDF encoder/decoder software and/or in other software for grouping pages into groups of grouped pages. Then, each group of grouped pages can be processed (e.g., printed, displayed, etc.) in parallel. In the context of printing pages to paper, such parallel processing can involve tandem printing or multi-page printing. Using groups of grouped pages can increase performance via parallel processing and may save machine resources (e.g., ink, toner, memory, processing cycles etc.).

Some criteria to be considered for grouping pages include, but are not limited to:
  color mode criteria—e.g., monochrome pages can be grouped together, color pages can be grouped together
  a transparency criteria—e.g., opaque (no transparency) pages can be grouped together, transparent (any percentage of transparency) pages can be grouped together
  an image weight criteria—e.g., "heavy" pages with mostly raster images in each page can be grouped together, "light" pages with few or no raster images in the pages can be grouped together
  duplexing criteria—e.g., duplex pages can be grouped, simplex pages can be grouped together
  paper size criteria—e.g., pages of same media sizes can be grouped together
  media type criteria—e.g., pages with same media type can be grouped together
  binding edge criteria—e.g., pages with same binding edge can be grouped together
  rendering processing index criteria—e.g., a rendering processing index value can be determined for each page to rank the page based on rendering complexity, and pages with the same or similar rendering processing index values can be grouped together.

Then, complex pages (such as pages having relatively high rendering processing index values) may be grouped for processing on a more capable imaging, printing, and/or computing device than simple pages (such as pages having relatively low rendering processing index values).

Use of the SDF can enable an imaging, printing, and/or computing device to process any SDF data stream by enabling SDF data stream to be processed without loading an entire SDF data stream before processing is started. Rather, the imaging, printing, and/or computing device can process the SDF data stream once the page to process is identified and its resources are known.

A reusable resource of an SDF data stream can be retained in memory and not flushed or discarded until after a last use of the reusable resource in the SDF data stream. The last use of the reusable resource can be determined using resource reference information; e.g., reference counts and/or lists of pages where the resource is used. Thus, a reusable resource can be cached after its first use and eventually reused in one or more later pages until its last use. This implies that some resources may be cached for a relatively-long time.

Some or all reusable resources of an SDF data stream can be stored in an in-memory cache (IMC) of an imaging, printing, and/or computing device processing (e.g., encoding, decoding) an SDF data stream. For example, the SDF encoder software and/or the SDF decoder software can obtain an in-memory cache from a cache, RAM, and/or another storage entity of the imaging, printing, and/or computing device.

In some examples, the in-memory cache storing reusable resources can grow relatively large; e.g., when a large number of reusable resources are cached for a relatively-long time until their respective last uses. SDF data streams with large numbers of reusable resources stored in in-memory caches may create a memory-related burden, thereby hindering the imaging, printing, and/or computing device from processing the whole SDF data stream.

To reduce and/or eliminate such memory-related burdens associated with in-memory caches, SDF encoder and SDF decoder software can use an external caching system and/or duplicate resources. The external caching system can store some or all of the reusable resources of one or more SDF data streams. In some examples, the functionality of an external caching system can be provided by a firmware component in an imaging, printing, and/or computing device and/or one or more blocks of allocated memory that can store reusable resources, perhaps in a local file or database. In some examples, the functionality of an external caching system can be provided by one or more memory servers, print servers, cloud computing devices, networked computers, portable computing devices, and/or other computing devices that can store or cache reusable resources. In some examples, the functionality of an external caching system can be provided by one or more internal storage devices and/or external storage devices (e.g., an internal flash drive, an external flash drive, an internal hard drive, an external hard drive, a RAM disk) of the imaging, printing, and/or computing device. Other techniques for providing the functionality of an external caching system are possible as well.

To determine replacement of resources in the in-memory cache, the in-memory cache can replace least-recently used and/or older resources already stored in the in-memory cache with most-recently used and/or newer resources. The replaced least-recently used and/or older resources can then be stored using the external caching system. Any imaging, printing, and/or computing device that can load all reusable resources into its in-memory cache can process a data stream formatted using SDF 400 or SDF 450 completely without waiting for the entire data stream to be fully available. And, even if the imaging, printing, and/or computing device does not have sufficient memory to store all reusable resources, the imaging, printing, and/or computing device can process a data stream formatted using SDF 400 or SDF 450 while using external caching system to store at least some of the reusable resources as discussed herein.

The SDF encoder and/or SDF decoder software can use the in-memory cache, the external caching system and/or a "CacheLimit" parameter while processing an SDF data stream. The SDF encoder software can set one or more thresholds or limits on number of reusable resources that can be stored in the in-memory cache and/or the amount of storage allocated to the in-memory cache. The threshold(s) can be set, for example, based on the size of the cache, on an expected number of resources in the SDF data stream, and/or otherwise determined; e.g., use a hard-coded threshold. Also, the SDF encoder software can initialize the CacheLimit parameter to False (or "F" for short).

While encoding the SDF data stream, the SDF encoder software can track a number of reusable resources stored in the in-memory cache and/or the amount of storage used in the in-memory cache. If the number of reusable resources and/or the amount of storage used in the in-memory cache reaches or exceeds a respective threshold, the SDF encoder software can set the "CacheLimit" parameter equal to true (or "T" for short). Thus, the CacheLimit parameter indicates when an in-memory cache has reached a storage limit as indicated by a respective threshold.

In some examples, once the CacheLimit parameter is set to T, the SDF encoder software can use the external caching system to store any additional reusable resources, at least until memory in the in-memory cache has been freed; i.e., after a last usage of a reusable resource in the SDF data stream. In some examples, once the CacheLimit parameter is set to T, the SDF encoder software can store one or more least recently used resources stored in the in-memory cache to the external caching system, and then remove those least recently used resources from the in-memory cache.

SDF decoder software can load reusable resources into the in-memory cache while decoding an SDF data stream. The SDF decoder software can store most-recently-used reusable resources and/or up to a threshold number or limit of reusable resources and in the in-memory cache. The SDF decoder software can remove a reusable resource from the in-memory cache after its last use in the SDF data stream. In some examples, the SDF decoder software can use an external caching service to store reusable resources.

When both an in-memory cache and an external caching system are used, the SDF encoder software (or the SDF decoder software) can check to see if a reusable resource RR1 that is going to be used for encoding (or decoding) the SDF data stream is in the in-memory cache or in the external caching system. If RR1 is in the in-memory cache, then the SDF encoder software (or the SDF decoder software) can retrieve RR1 from the in-memory cache and then use RR1 for encoding (or decoding) the SDF data stream. If RR1 is stored by the external caching system, then the SDF encoder software (or the SDF decoder software) can use the external caching system to obtain RR1 and then use RR1 for encoding (or decoding) the SDF data stream. In some examples, after obtaining RR1 from the external caching service, the SDF encoder software (or the SDF decoder software) can determine whether RR1 has further uses in the SDF data stream and can be stored in the in-memory cache. Then, if RR1 has further uses in the SDF data stream and can be stored in the in-memory cache, the SDF encoder software (or the SDF decoder software) can store RR1 in the in-memory cache.

In some examples, the SDF encoder software and/or the SDF decoder software can store all reusable resources using the external caching system; i.e., the SDF encoder software and/or the SDF decoder software may not use an in-memory cache. Then, when a reusable resource is needed during encoding (or decoding), the SDF encoder software (or the SDF decoder software) will retrieve the reusable resource from the external caching system. In some of these examples, the external caching system can persistently store some or all reusable resources during encoding of a SDF data stream. Then, when the SDF data stream is being decoded, some or all reusable resources can be obtained from the external caching system. Storing some or all reusable resources in the external caching system can reduce the size of a resulting SDF data stream, since the SDF data stream will not include some, if not all reusable resources. In other of these examples, the external caching system can persistently store all resources, reusable or not, during encoding of an SDF data stream, thereby further shrinking the size of the resulting SDF data stream.

In some examples, after the CacheLimit parameter is set to T, the SDF encoder software can allow resources to be duplicated in subsequent pages that needed the same resource. Duplicating resources throughout the SDF data stream can lead to a larger SDF data stream (due to the duplicated resources), but the SDF data stream is still suitable for FCFS processing. In these examples, once a threshold is reached or exceeded, resources in one page cannot refer to resources in a previous page, as an assumption that a previous-page resources is in the cache may be incorrect. Instead, once a threshold is reached or exceeded, a reusable resource can be copied and stored with each page that uses the reusable resource. Duplicating resources throughout the SDF data stream can ensure that the SDF data stream will be viewable and printable. In some examples, once the CacheLimit parameter is set to T, the SDF encoder software can duplicate one or more least recently used resources stored in the in-memory cache to the SDF data stream, and then remove those least recently used resources from the in-memory cache.

In some examples, an in-memory cache can be accompanied by look-ahead software. The look-ahead software can parse one or more pages of the SDF data stream during encoding or decoding to identify which reusable resources will be used during encoding or decoding the parsed page(s). After identifying these reusable resources that will be used, the look-ahead software can load these reusable resources into the in-memory cache (or another memory object than the in-memory cache, such as one or more blocks of memory) in advance, thereby speeding memory access for reusable resources. In some examples, the look-ahead software can replace resources in the in-memory cache that will not be needed in current page that is being actively processed with the identified reusable resources.

FIGS. 6, 7, 8, and 9 show flowcharts for method 600 for converting an input data stream formatted using F1 format 300 to an output data stream formatted using either SDF 400 or SDF 450, according to example embodiments. Method 600 can be carried out by a computing device, such as computing device 200. In some examples, method 600 can be carried out by a printing device, such as, but not limited to, printing device 110, printing device 112, and/or printing device 114.

The procedures of method 600 can be used to convert an input data stream formatted using F1 format 300 to an output data stream formatted using either SDF 400 or SDF 450; that is, method 600 can be used to encode an F1-formatted data stream into an SDF data stream formatted using either SDF 400 or SDF 450. In some examples, method 600 can embody an encoder function for encoding data streams using either SDF 400 or SDF 450 from input data streams in F1 format 300. That is, method 600 can embody a herein-described encoder function and software carrying out method 600 can act as herein-described SDF encoder software.

As part of creating the data stream using either SDF 400 or SDF 450, method 600 will sort the resources formatted in F1 format 300 into the order they appear or are referenced in pages of the input. For example, resources first used on page 1 of the input data stream will be rearranged to be on page 1 of the output data stream, resources first used on page 2 of the input data stream will be rearranged to be on page 2 of the output data stream, and so on.

Method 600 can begin at block 610, where the computing device can perform a Pass 1 of method 600. During Pass 1, the computing device can receive F1-formatted input F1I, parse F1I to identify all reusable resources, and create output SDF data stream F2O initially using SDF 400. For example, F1-formatted input F1I can be a data stream formatted using F1 format 300. Pass 1 of method 600 is described in more detail below in the context of FIG. 7.

At block 620, the computing device can perform a Pass 2 of method 600. During Pass 2, the computing device can generate SDF-formatted data for output SDF data stream F2O from F1-formatted input F1I. Pass 2 of method 600 is described in more detail below in the context of FIG. 8.

At block 622, the computing device can determine whether to use a resource table in output SDF data stream F2O. In other words, the computing device can determine whether to use SDF 400 or SDF 450 to format F2O at block 622. The computing device can determine whether to use SDF 400 or SDF 450 based on user input, such as an input parameter provided to the computing device selecting either SDF 400 output or SDF 450 output. Other techniques for determine whether to use SDF 400 or SDF 450 are possible as well.

If the computing device determines to use a resource table in output SDF data stream F2O/use SDF 400, the computing device can proceed to block 640. Otherwise, the computing device can determine not to use a resource table in F2O/use SDF 450 and can proceed to block 630.

At block 630, the computing device can perform a Pass 3 of method 600. During Pass 3, the computing device can reorganize resource references in output SDF data stream F2O to remove a resource table from F2O; that is, the computing device can convert F2O from SDF 400 (as generated during Passes 1 and 2) to SDF 450. Pass 3 of method 600 is described in more detail below in the context of FIG. 9.

At block 640, the computing device can output SDF data stream F2O. In some examples, the computing device can provide F2O as while Passes 1, 2, and 3 are progressing. In those examples, the computing device can complete outputting of F2O at block 640. In some examples, the computing device can close F1-formatted input F1I and/or F2O at block 640. Upon completion of the procedures of block 640, method 600 can be completed.

Figure 7:
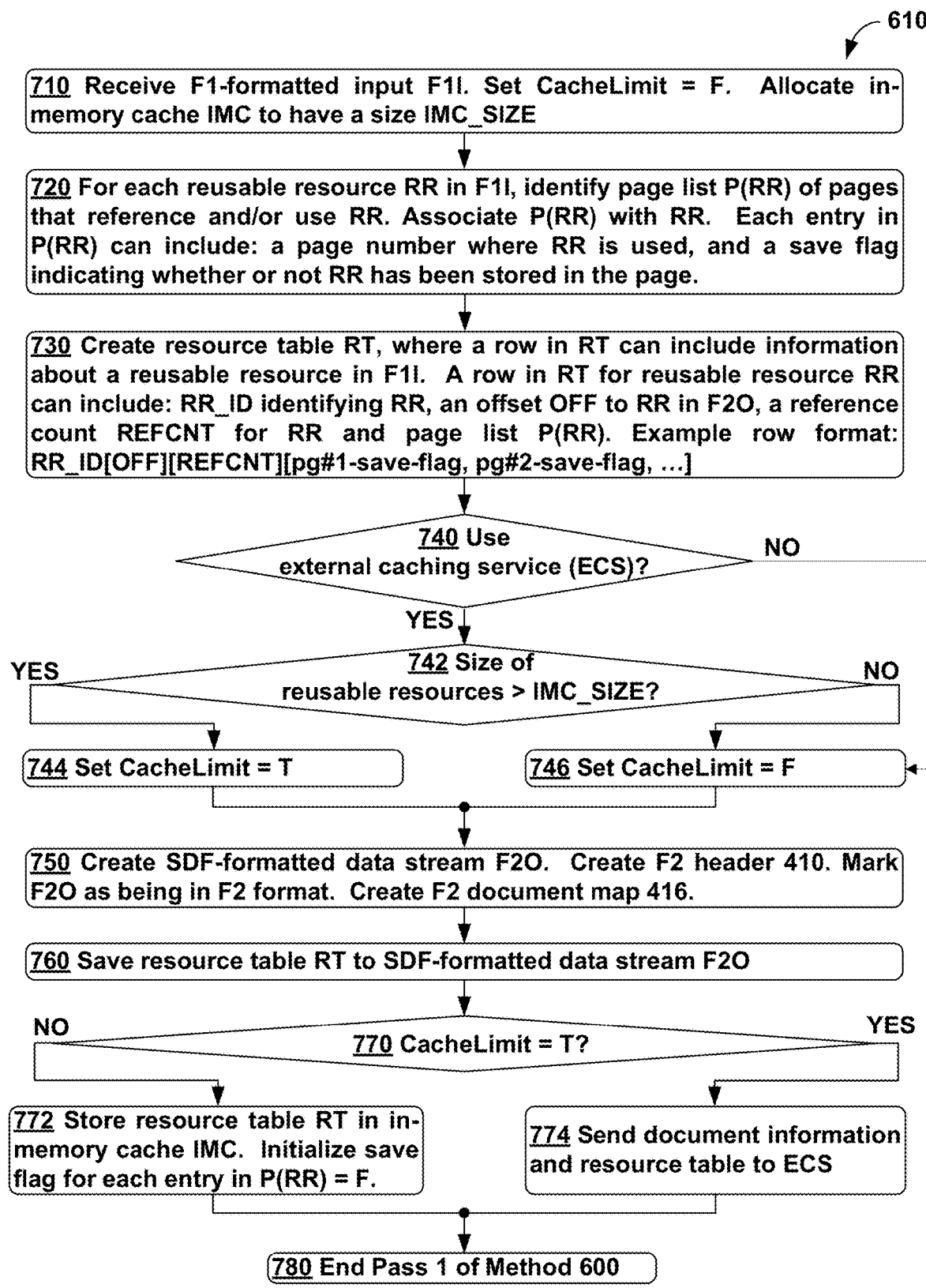

FIG. 7 shows a flow chart for a procedure for carrying out Pass 1 of method 600, according to example embodiments. That is, FIG. 7 describes a procedure for carrying out block 610 of FIG. 6, and so the computing device carrying out method 600 can be used to carry out the procedures described in the context of FIG. 7.

FIG. 7 indicates that Pass 1 of method 600 can begin at block 710, wherein the computing device can receive F1-formatted input F1I; e.g., by opening a data stream having F1-formatted input F1I. The computing device can also set a CacheLimit parameter equal to "F" for False and can allocate memory for in-memory cache IMC to have a size IMC_SIZE In some examples, an in-memory cache is not used, and so no memory is allocated to the in-memory cache IMC; in these examples, IMC_SIZE can be set to 0 (zero).

At block 720, the computing device can, for each reusable resource RR in F1-formatted input F1I, identify a page list P(RR) of pages that reference and/or use RR. For example, the computing device can scan F1-formatted input F1I to find resources in the pages of F1I, and update page lists for each resource found in F1-formatted input F1I by recording each page where a resource is found during the scan. Each entry in P(RR) can include: a page number where RR is used, and a save flag indicating whether or not RR has been stored in the page. The computing device can associate P(RR) with reusable resource RR.

At block 730, the computing device can create a resource table RT, where a row in RT can include information about a reusable resource in F1-formatted input F1I. A row in RT for reusable resource RR can include data such as: a resource identifier RR_ID identifying RR, an offset OFF to RR in output SDF data stream F2O indicating a number of bytes from the beginning of F2O to the beginning of RR within F2O, a reference count REFCNT for RR and page list P(RR). An example format of a row in resource table RT: RR_ID[OFF][REFCNT][pg #1-save-flag, pg #2-save-flag, . . . ]

At block 740, the computing device can determine whether an external caching service ECS is being used during execution of method 600; i.e., whether an external caching service is being used to encode F1-formatted input F1I as output SDF data stream F2O. For example, the computing device can receive user input indicating an external caching service is being used, attempt to connect to or otherwise utilize the external caching service, or otherwise determine whether or not an external caching service is available and/or being used during execution of method 600. If the computing device determines that external caching service ECS is being used during execution of method 600, the computing device can proceed to block 742. Otherwise, the computing device can determine that an external caching service is not being used during execution of method 600 and can proceed to block 746.

At block 742, the computing device can determine whether a size of reusable resources in F1-formatted input F1I is greater than IMC_SIZE, which is the size of in-memory cache IMC. The size of reusable resources in F1-formatted input F1I can be determined at block 720 while scanning F1I by tracking the sizes of reusable resources found during the scan and then summing the sizes of the reusable resources that were found. If the computing device determines the size of reusable resources in F1I is greater than IMC_SIZE, the computing device can proceed to block 744. Otherwise, the computing device can determine the size of reusable resources in F1I is not greater than IMC_SIZE and can proceed to block 746.

At block 744, the computing device can set the CacheLimit parameter equal to "T" for True and then proceed to block 750. For example, the CacheLimit parameter being set equal to T can indicate that an external caching service is available and may have to be used to store reusable resources during execution of method 600.

At block 746, the computing device can set the CacheLimit parameter equal to F and proceed to block 750. For example, the CacheLimit parameter being set equal to F can indicate that an external caching service is unavailable or that an external caching service is not expected to be used to store reusable resources during execution of method 600.

At block 750, the computing device can create output SDF data stream F2O. As part of creating F2O, the computing device can create SDF header 410 for F2O can indicate that F2O is an SDF data stream; e.g., by setting SDF identifier 412 of SDF header 410 to indicate that F2O is an SDF data stream. The computing device can create SDF document map/page table 416. For example, during the scan of F1-formatted input F1I at block 720, the computing device can determine a number of pages N in F1-formatted input F1. Then, as F2O will have the same number of pages N as in F1-formatted input F1, the computing device can create SDF document map/page table 416 to have N page/offset pairs for storing page and offset data. In some examples, the computing device can, at block 750, update a created SDF document map/page table 416 at least with page number information found during the scan of F1-formatted input F1I at block 720.

At block 760, the computing device can save resource table RT to output SDF data stream F2O; e.g., as SDF resource table 420. By saving RT to F2O, the computing device has formatted F2O using SDF 400.

At block 770, the computing device can determine whether CacheLimit is set to T. If CacheLimit is set to T, the computing device can proceed to block 774. Otherwise, the computing device can determine that CacheLimit is not set to T (e.g., CacheLimit is set to F) and can proceed to block 772.

At block 772, the computing device can store resource table RT in in-memory cache IMC and can initialize a save flag for each entry in P(RR) to "F" for false. Upon completion of the procedures of block 772, the computing device can proceed to block 780.

At block 774, the computing device can send document information and resource table RT to the external caching service for storage. In some examples, the computing device can store part, but not all, of resource table RT using the external caching service; i.e., part of resource table RT can be stored in in-memory cache IMC. Then, the computing device can send document information and part of resource table RT to the external caching service At block 780, the computing device can complete the procedures of Pass 1 of method 600.

Figure 8:
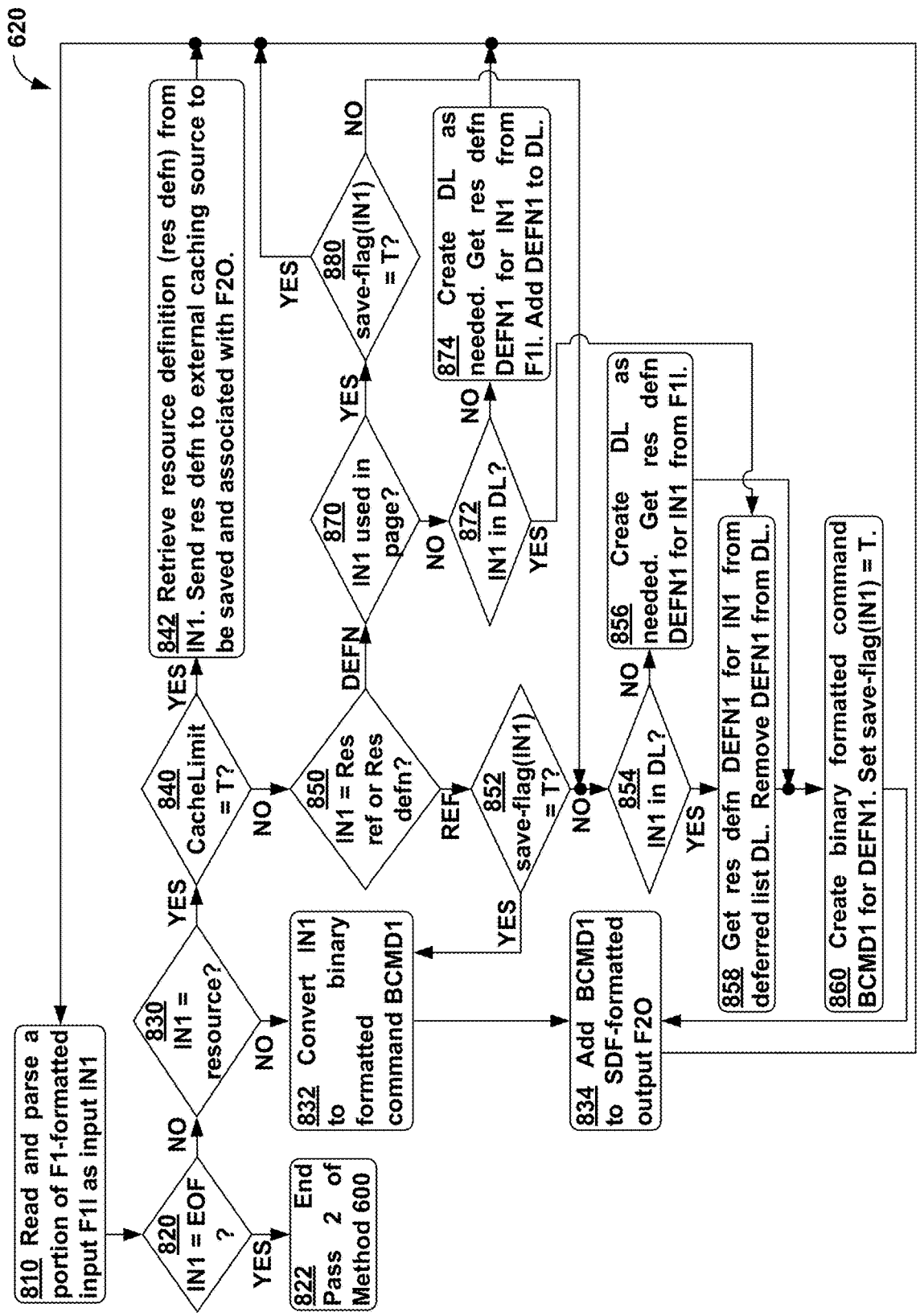

FIG. 8 shows a flow chart for a procedure for carrying out Pass 2 of method 600, according to example embodiments. That is, FIG. 8 describes a procedure for carrying out block 620 of FIG. 6, and so the computing device carrying out method 600 can be used to carry out the procedures described in the context of FIG. 8.

FIG. 8 indicates that Pass 2 of method 600 can begin at block 810, wherein the computing device can read and parse a portion of F1-formatted input F1I as input IN1.

At block 820, the computing device can determine where an end of file (EOF) condition was reached in trying to read F1-formatted input F1I to obtain input IN1. If an end of file condition was reached in trying to read F1I, the computing device can proceed to block 820. Otherwise, the computing device can determine that the end of file condition was not reached, and proceed to block 830.

At block 822, the computing device can complete the procedures of Pass 2 of method 600.

At block 830, the computing device can determine whether input IN1 is a resource based on the parse of IN1 performed at block 810. If input IN1 is a resource, the computing device can proceed to block 840. Otherwise, the computing device can determine that input IN1 is not a resource, e.g., input IN1 is an F1-formatted command, and can proceed to block 832.

At block 832, the computing device can convert IN1 to binary formatted command BCMD1. BCMD1 can be an SDF command having a format of "command_id[size][parameters]" where "command_id" is a binary/numerical code for the command, size specifies a length of the following parameters field, and the parameters field specifies data for executing the command, such as discussed at least in the context of FIGS. 4A and 4B. In particular, the computing device can convert an operator of an F1-formatted command (i.e., a text-formatted operator) to a binary/numerical code. For example, the computing device can convert a "Do" operator in F1 format 300 to a numerical code of 20 to be used as a command_id for BCMD1. Many other examples of converting IN1 to binary formatted commands are possible as well.

At block 834, the computing device can add BCMD1 to output SDF data stream F2O. Upon completion of the procedures of block 834, the computing device can proceed to block 810.

At block 840, the computing device can determine whether the CacheLimit parameter is set to T. If the CacheLimit parameter is set to T, the computing device can proceed to block 842. Otherwise, the computing device can determine that the CacheLimit parameter is not set to T (e.g., the CacheLimit parameter is set to F) and can proceed to block 850.

At block 842, the computing device can retrieve a resource (res) definition (defn) from input IN1, as input IN1 was previously determined to be a resource at block 830. Then, the computing device can send the retrieved resource definition to external caching source to be saved and associated with output SDF data stream F2O, as CacheLimit is set to T. Upon completion of the procedures of block 842, the computing device can proceed to block 810.

At block 850, the computing device can determine whether input IN1 is a resource reference (ref) or a resource definition based on the parse of input IN1 performed at block 810. If input IN1 is a resource reference, the computing device can proceed to block 852. Otherwise, the computing device can determine that input IN1 is a resource definition and proceed to block 870.

At block 852, the computing device can determine whether "save-flag(IN1)" is set to T. save-flag(IN1) is a variable that indicates whether the resource referred to by the resource reference IN1 is stored by the computing device; e.g., in an in-memory cache. When save-flag(IN1) is set to T, the resource referred to by the resource reference IN1 is stored by the computing device; otherwise, the resource referred to by the resource reference IN1 is not stored by the computing device. If save-flag(IN1) is set to T, then the computing device can proceed to block 832. Otherwise, the computing device can determine that save-flag (IN1) is not set to T (e.g., the save-flag(IN1) variable is set to F) and can proceed to block 854.

At block 854, the computing device can determine whether the resource referred to by resource reference IN1 is on a deferred list DL. Deferred list DL can store resources that have been defined in F1-formatted input F1I but have not yet been used in F1I. So, the computing device can determine whether the resource referred to by resource reference IN1 is on DL by searching DL for the resource referred to by IN1. If the computing device determines that the resource referred to by resource reference IN1 is on deferred list DL, then the computing device can proceed to block 858. Otherwise, the computing device can determine that the resource referred to by resource reference IN1 is not on DL and can proceed to block 856.

At block 856, the computing device can create deferred list DL, if DL has not already been created. Then, the computing device can obtain a resource definition DEFN1 for the resource referred to by resource reference IN1 from F1-formatted input F1I. Upon completion of the procedures of block 856, the computing device can proceed to block 860.

At block 858, the computing device can obtain a resource definition DEFN1 from deferred list DL and then remove the resource definition DEFN1 from deferred list DL.

At block 860, the computing device can create binary formatted command BCMD1 using the resource definition DEFN1. BCMD1 can have the format "resource_id[size][binarydata]", where "resource_id" is an identifier for the resource referred to by input IN1, "size" is a size in bytes of "binarydata", and "binarydata" represents parameter data defining the resource referred to by input IN1 and can include resource reference information for the resource referred to by input IN1, such as discussed in the context of at least FIGS. 4A and 4B. The computing device can also set the save-flag(IN1) variable equal to T. Upon completion of the procedures of block 860, the computing device can proceed to block 834.

At block 870, the computing device can determine whether the resource defined by input IN1 is used on the current page of F1-formatted input F1I; e.g., by searching a cross-reference table of F1I for the resource defined by input IN1. If the computing device determines that the resource defined by input IN1 is used on the current page, then the computing device can proceed to block 880. Otherwise, the computing device can determine that the resource defined by input IN1 is not used on the current page and proceed to block 872.

At block 872, the computing device can determine whether the resource defined by input IN1 is on deferred list DL, where DL is discussed above in the context of block 854. The computing device can determine whether the resource defined by input IN1 is on deferred list DL by searching DL for the resource defined by IN1. If the computing device determines that the resource defined by input IN1 is on deferred list DL, then the computing device can proceed to block 858. Otherwise, the computing device can determine that the resource defined by input IN1 is not on DL and can proceed to block 874.

At block 874, the computing device can create deferred list DL, if DL has not already been created. Then, the computing device can obtain a resource definition DEFN1 for the resource defined by input IN1 from F1-formatted input F1I and can add resource definition DEFN1 to DL. Upon completion of the procedures of block 874, the computing device can proceed to block 810.

At block 880, the computing device can determine whether "save-flag(IN1)" is set to T. save-flag(IN1) is a variable that indicates whether the resource defined by input IN1 is stored by the computing device. If the resource defined by input IN1 is already stored by the computing device, then the resource defined by input IN1 is a duplicate definition and so can be discarded. save-flag(IN1) is also discussed above in the context of block 852. If save-flag (IN1) is set to T, then the computing device can proceed to block 810 (thereby effectively discarding the resource defined by input IN1). Otherwise, the computing device can determine that save-flag(IN1) is not set to T (e.g., the save-flag(IN1) variable is set to F) and can proceed to block 854.

Figure 9:
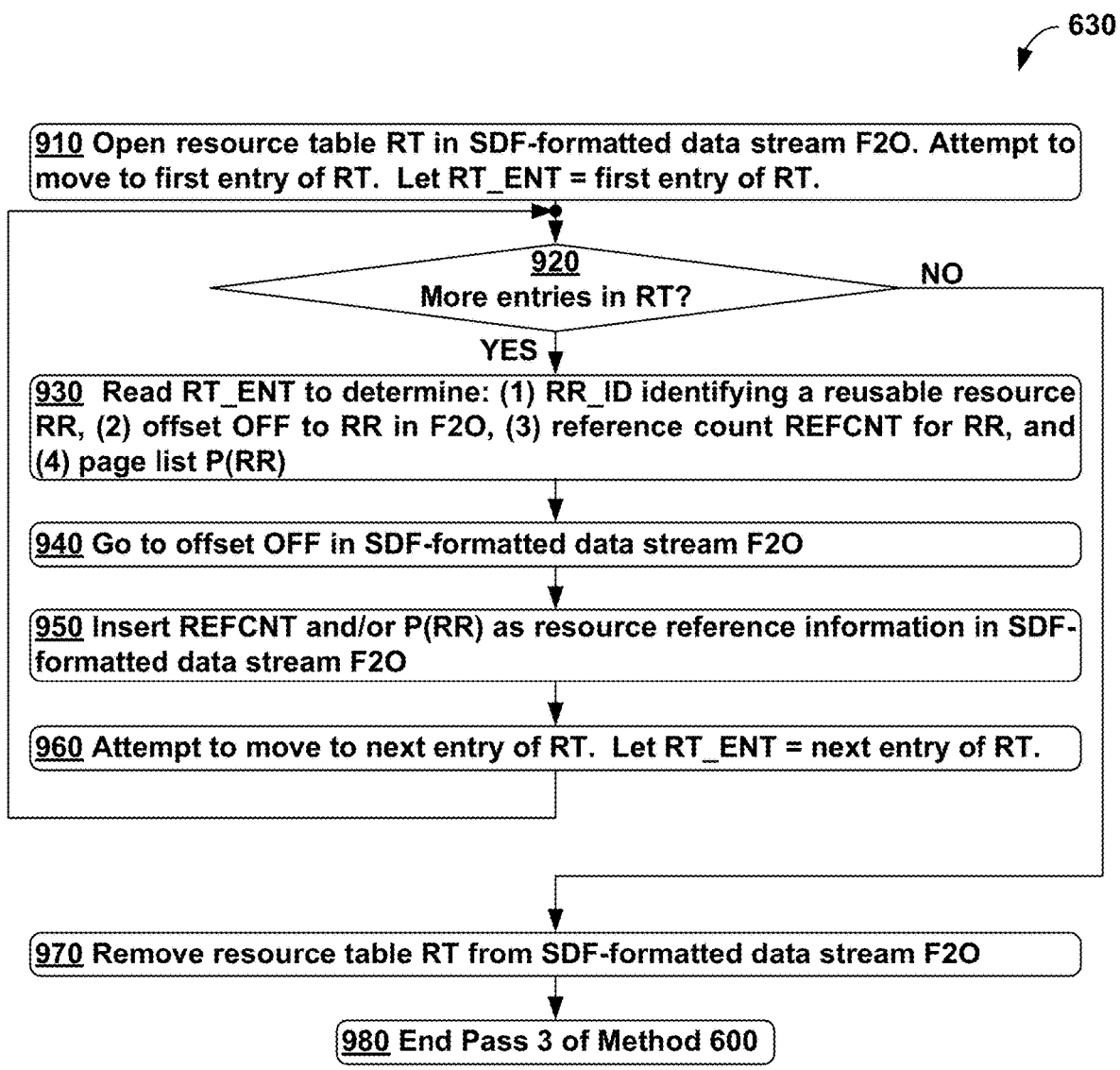

FIG. 9 shows a flow chart for a procedure for carrying out Pass 3 of method 600, according to example embodiments. That is, FIG. 9 describes a procedure for carrying out block 630 of FIG. 6, and so the computing device carrying out method 600 can be used to carry out the procedures described in the context of FIG. 9.

FIG. 9 indicates that Pass 3 of method 600 can begin at block 910, wherein the computing device can open resource table RT in output SDF data stream F2O; e.g., open SDF resource table 420 of SDF 400, where resource table RT has zero or more entries. The computing device can then attempt to move to a first entry in resource table RT and set RT_ENT to the first entry in resource table RT.

At block 920, the computing device can determine whether there are more entries in resource table RT. For example, if RT has zero entries, the computing device can determine that there are no more entries by attempting to move to the first entry of resource table RT at block 910. If RT has one or more entries, the computing device can determine that there are no more entries by attempting to move past the end of resource table RT at block 960. If the computing device determines that there are more entries in resource table RT, the computing device can proceed to block 930. Otherwise, the computing device can determine that there are no more entries and proceed to block 970.

At block 930, the computing device can read resource table entry RT_ENT to determine: (1) RR_ID identifying a reusable resource RR; (2) an offset OFF to RR in output SDF data stream F2O; (3) a reference count REFCNT for RR; and (4) page list P(RR). In some examples, page list P(RR) may not be present in RT_ENT; if so, parsing RT_ENT will not determine page list P(RR).

At block 940, the computing device can go to offset OFF in output SDF data stream F2O.

At block 950, the computing device can insert resource reference information in output SDF data stream F2O. That is, the computing device can insert REFCNT and P(RR) (if P(RR) is present in ROW ENT) in F2O, thereby placing the resource reference information as parameter data for the resource in F2O. The computing device can also update size information for the resource to account for the inserted resource reference information. In some examples, the computing device may have to move to the end of a resource definition that begins at offset OFF before inserting the resource reference information.

At block 960, the computing device can attempt to move to a next entry in resource table RT and set RT_ENT to that next entry in resource table RT. Upon completion of the procedures of block 960, the computing device can proceed to block 920.

At block 970, the computing device can remove resource table RT from output SDF data stream F2O, thereby completing conversion of F2O from using SDF 400 to using SDF 450.

At block 980, the computing device can complete the procedures of Pass 3 of method 600.

Figure 10:
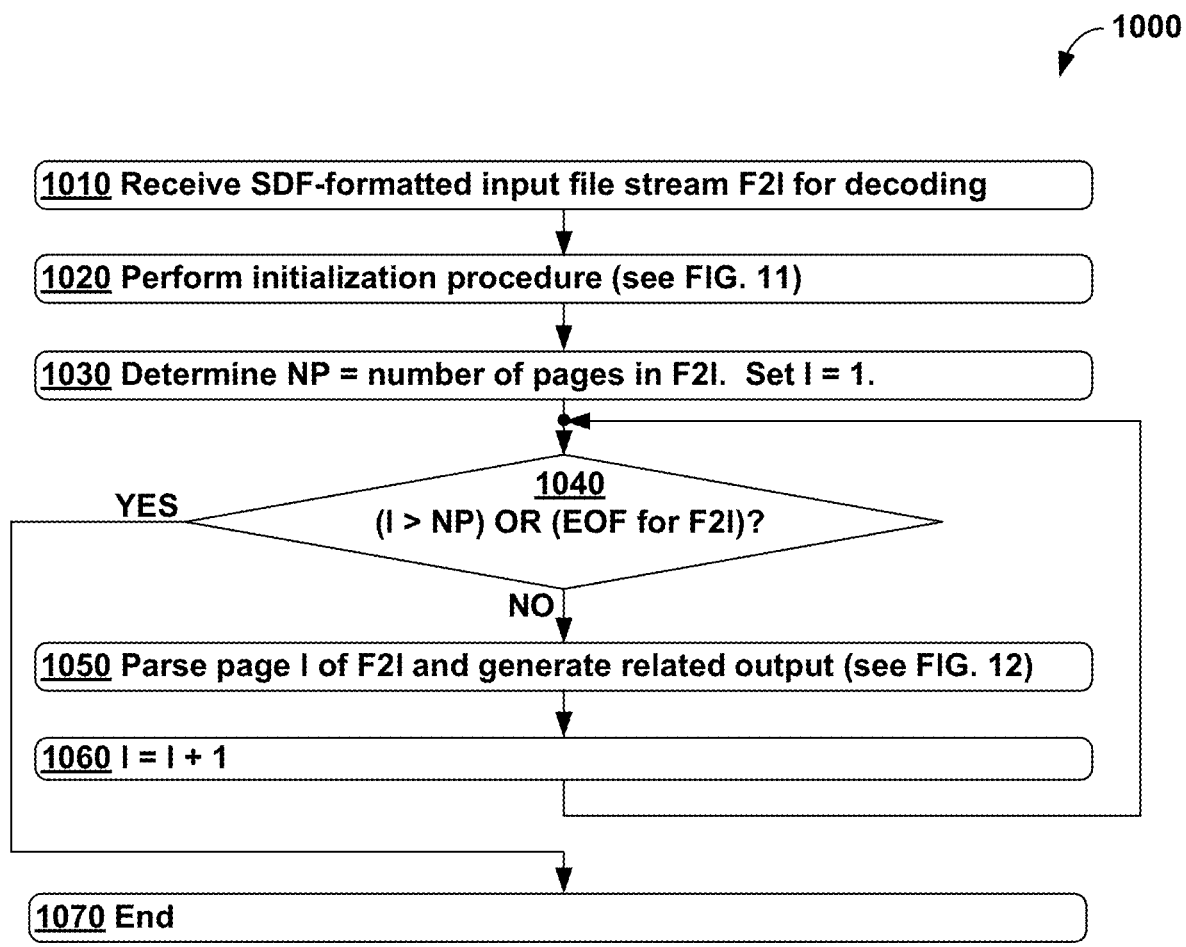
FIGS. 10, 11, and 12 show flowcharts for a method for generating output based on an input data stream formatted using the format of either FIG. 4A or FIG. 4B, according to example embodiments.
Figure 11:
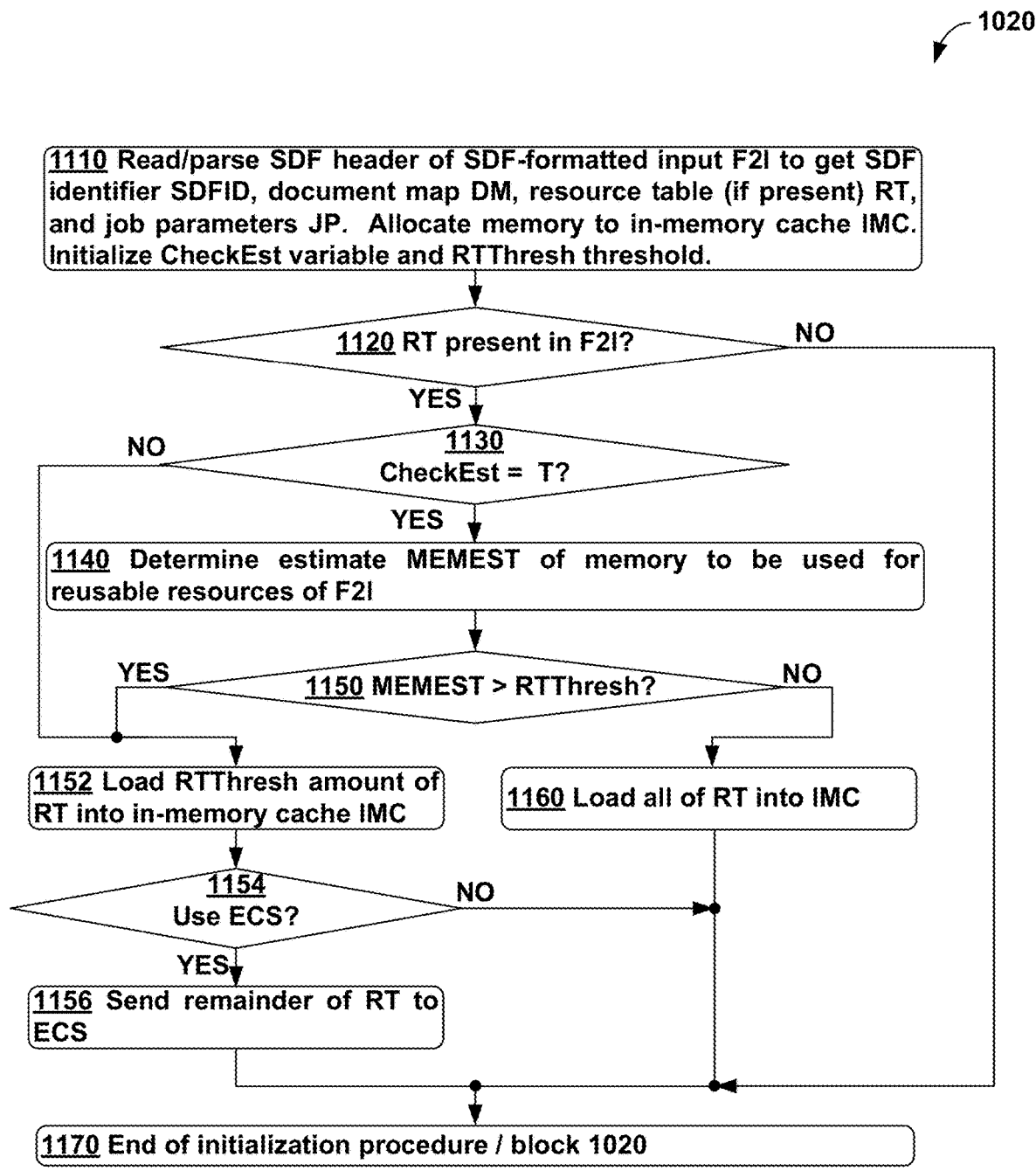
Figure 12:
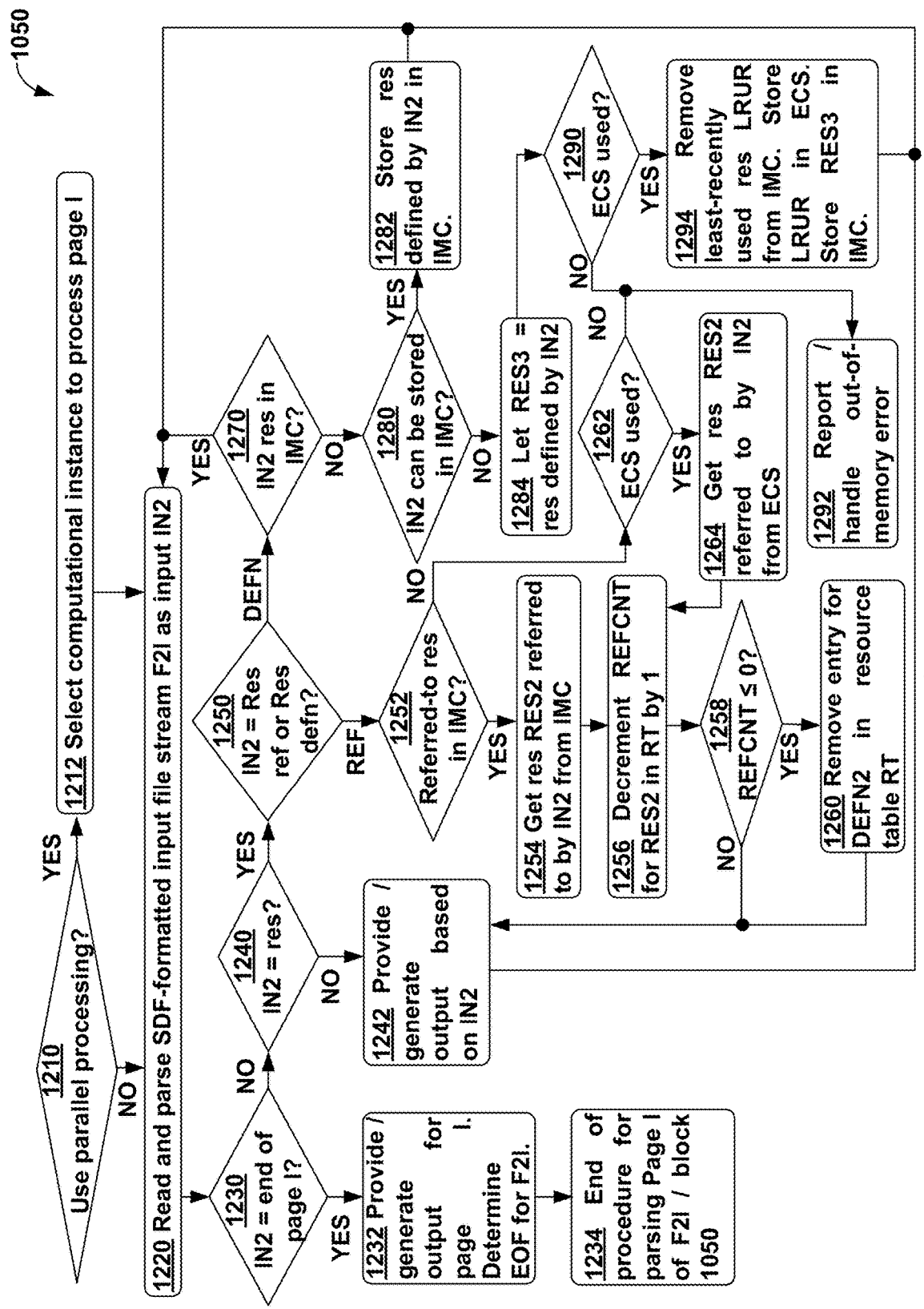

FIGS. 10, 11, and 12 show flowcharts for method 1000 for generating output based on an input data stream formatted using either SDF 400 or SDF 450, according to example embodiments. Method 1000 can be carried out by a computing device, such as computing device 200. In some examples, method 1000 can be carried out by a printing device, such as, but not limited to, printing device 110, printing device 112, and/or printing device 114.

The procedures of method 1000 can be used to generate output based on an input data stream formatted using either SDF 400 or SDF 450; that is, to decode the input data stream formatted using either SDF 400 or SDF 450. In some examples, method 1000 can embody a decoder to decode data streams using either SDF 400 or SDF 450. That is, method 1000 can embody a herein-described decoder function and software carrying out method 1000 can act as herein-described SDF encoder software. In some examples, software can be configured to carry out both methods 600 and 1000; then, such software can act as herein-described SDF encoder/decoder software.

During method 1000, each command in the input data stream that is parsed and executed can be considered to be consumed after parsing and related processing. Method 1000 generates an open data stream that can be parsed continually and discarded as data are consumed. In some examples, the open data stream provided by method 1000 can be parsed to generate image-related output, and that image-related output can be stored in another data stream for storage, communication, printing, display, etc. For example, the image-related output can be a raster, stream, file, or other collection of pixels that can be displayed as one or more images of pages and/or printed as one or more images of pages.

Method 1000 can begin at block 1010, where the computing device can receive input SDF data stream F2I for decoding. For example, the computing device can open or otherwise obtain access to F2I.

At block 1020, the computing device can perform an initialization procedure for decoding based on data obtained from a header of input SDF data stream F2I. The initialization procedure for decoding of method 1000 is described in more detail below in the context of FIG. 11.

At block 1030, the computing device can determine an NP variable as a number of pages in input SDF data stream F2I and can set a variable I equal to 1.

At block 1040, the computing device can determine whether (1) I is greater than NP or (2) an end of file (EOF) condition has been reached for input SDF data stream F2I. If either I is greater than NP or an EOF condition has been reached for F2I, the computing device can proceed to block 1070. Otherwise, the computing device can determine that I is less than or equal to NP and that an EOF condition has not been reached for F2I, and can proceed to block 1050.

At block 1050, the computing device can parse page I of input SDF data stream F2I and generate related output. A procedure for parsing page I of method 1000 is described in more detail below in the context of FIG. 12.

At block 1060, the computing device can increment I by 1; that is, set I=I+1.

At block 1070, the computing device can complete method 1000. In some examples, the computing device can close the open data stream provided as an output of method 1000 at block 1070. Then, upon completion of the procedures of block 1070, method 1000 can be completed.

FIG. 11 shows a flow chart for an initialization procedure for method 1000, according to example embodiments. That is, FIG. 11 describes a procedure for carrying out block 1020 of FIG. 10, and so the computing device carrying out method 1000 can be used to carry out the procedures described in the context of FIG. 11.

FIG. 11 indicates that the initialization procedure can begin at block 1110, wherein the computing device can read and/or parse SDF header of input SDF data stream F2I to get SDF identifier SDFID, document map DM, resource table (if present) RT, and job parameters JP. The computing device can allocate zero or more bytes of memory to in-memory cache IMC used for decoding F2I. And, the computing device can initialize variable CheckEst as either T or F and variable RTThresh as a threshold amount of resource table RT to be stored in memory of the computing device. For example, if the computing device allocates an amount of memory IMCSIZE to in-memory cache IMC for decoding F2I, then RTThresh can be determined based on a percentage of IMCSIZE. As another example, the computing device can allocate an amount of memory RTSIZE to store a resource table of F2I, and RTThresh can be initially set to RTSIZE. Other techniques to determine RTThresh are possible as well.

At block 1120, the computing device can determine whether resource table RT is present in input SDF data stream F2I. For example, the computing device can examine SDF identifier SDFID to determine whether SDFID indicates whether F2I is in SDF 400, and so has resource table RT, or is in SDF 450 and so does not have resource table RT. As another example, the computing device can go to an end of document map DM and determine whether or not a resource table entry is found there, indicating respectively, whether F2I has resource table RT or whether F2I does not have resource table RT. If the computing device determines that resource table RT is present in F2I, then the computing device can proceed to block 1130. Otherwise, the computing device can determine that resource table RT is not present in F2I and can proceed to block 1170.

At block 1130, the computing device can determine whether CheckEst equals T, and so whether a memory estimate used by the computing device during the initialization procedure. If the computing device determines that CheckEst equals T, then the computing device can proceed to block 1140. Otherwise, the computing device can determine that CheckEst does not equal T (e.g., CheckEst equals F) and can proceed to block 1152.

At block 1140, the computing device can determine an estimate MEMEST of memory to be used for storing the resource table of input SDF data stream F2I using hard coded data, historical information about memory used and/or resource table sizes observed during decoding SDF data streams, and/or other techniques (e.g., determining an actual size of the resource table RT in F2I).

At block 1150, the computing device can determine whether memory estimate MEMEST is greater than threshold RTThresh. If MEMEST is greater than RTThresh, then the computing device can proceed to block 1152. Otherwise, the computing device can determine that MEMEST is not greater than RTThresh and can proceed to block 1160.

At block 1152, the computing device can load RTThresh amount of RT into in-memory cache IMC.

At block 1154, the computing device can determine whether an external caching service ECS is going to be used during execution of method 1000. Determining whether an external caching service is going to be used by the computing device is discussed in more detail at least in the context of block 740. If the computing device determines that external caching service ECS is being used during execution of method 1000, the computing device can proceed to block 1156. Otherwise, the computing device can determine that an external caching service is not being used during execution of method 1000 and can proceed to block 1170.

At block 1156, the computing device can send a remainder (if any) of resource table RT that was not loaded into IMC at block 1152 to the external caching service ECS. Upon completion of the procedures of block 1156, the computing device can proceed to block 1170.

At block 1160, the computing device can load all of resource table RT into in-memory cache IMC.

At block 1170, the computing device can complete the initialization procedure of method 1000/block 1020.

FIG. 12 shows a flow chart for procedure for parsing page I as part of method 1000, according to example embodiments. That is, FIG. 12 describes a procedure for carrying out block 1050 of FIG. 10, and so the computing device carrying out method 1000 can be used to carry out the procedures described in the context of FIG. 12.

FIG. 12 indicates that the procedure for parsing page I can begin at block 1210, wherein the computing device can determine whether to use parallel processing while performing method 1000. For example, a job parameter of job parameters JP determined at block 1110 and/or another job parameter or other data can indicate whether to use parallel processing while performing method 1000. As another example, the computing device can determine whether multiple computational instances (e.g., processors, cores, threads, SoC) have been allocated to perform method 1000. If multiple computational instances have been allocated to perform method 1000, the computing device can determine that parallel processing is to be used; otherwise, the computing device can determine that parallel processing is not to be used. Other techniques for determining whether to use parallel processing while performing method 1000 are possible as well. If the computing device determines to use parallel processing while performing method 1000, then the computing device can proceed to block 1212. Otherwise, the computing device can determine not to use parallel processing while performing method 1000 and can proceed to block 1220.

At block 1212, the computing device can select a computational instance to decode page I.; i.e., the selected computational instance takes the role of the herein-described computing device at least for decoding page I.

At block 1220, the computing device can read and parse a portion of input SDF data stream F2I for page I as input IN2.

At block 1230, the computing device can determine whether input IN2 indicates that the computing device is at the end of page I. For example, the computing device can have data about how much data page I utilizes in input SDF data stream F2I and can determine whether all of the data that page I utilizes in F2I has been processed/decoded by the computing device—if all of the data has been processed, the computing device can determine that the computing device is at the end of page I. Other techniques for determining that the computing device is at the end of page I are possible as well. If the computing device determines that input IN2 indicates that the computing device is at the end of page I, the computing device can proceed to block 1232. Otherwise, the computing device can determine that the computing device is not at the end of page I and can proceed to block 1240.

At block 1232, the computing device can provide/generate output for page I; i.e., output can be provided/generated since the end of page I has been reached. For example, as page I is being decoded by the computing device, data for one or more graphics orders for outputting a depiction of page I (e.g., a display, a printed page, a file, a data stream) can be determined. Then, at block 1232, the computing device can generate the one or more graphics orders, and those graphics orders can be carried out (e.g., by a printing pipeline, a graphics pipeline, and/or other related hardware and/or software) to output the depiction of page I. For example, a depiction of page I may be presented on a display and/or printed. In addition or alternatively, a depiction of page I may be represented as image data having a format such as, for example, a bitmap format, portable network graphic (PNG) format, tagged image file format (TIFF), or graphics interchange format (GIF). The image data may be saved to a file and/or streamed. Further, multiple pages may, for example, be represented in a slideshow file and/or video file. As another example, as page I is being decoded by the computing device, the computing device can generate a raster or other data structure of pixels or other data (e.g., bits, voxels) that can be used for outputting a depiction of page I. Then, at block 1232, the computing device can output the raster or other data structure to output a depiction of page I. As another example, as page I is being decoded by the computing device, the computing device can generate and/or provide an open data stream of commands and/or data that can be carried out and/or otherwise utilized to output a depiction of page I. Then, at block 1232, the computing device can generate and/or provide an indication that the end of page I has been reached, which may cause output of a depiction of page I. Many other examples of provide output of a depiction of page I are possible as well.

Also, at block 1232, the computing device can determine whether an end of file condition has been reached in input SDF data stream F2I.

At block 1234, the computing device can complete the procedure for parsing page I of method 1000/block 1050.

At block 1240, the computing device can determine whether input IN2 is a resource based on the parse of IN2 performed at block 1220. If input IN2 is a resource, the computing device can proceed to block 1250. Otherwise, the computing device can determine that input IN2 is not a resource, e.g., input IN2 is a SDF command, and can proceed to block 1242.

At block 1242, the computing device can provide/generate output based on IN2. As one example, if input IN2 is an SDF command, the SDF command can be carried out to provide an output at least partially depict page I. As another example, if input IN2 is a resource, then the computing device can define the resource (e.g., provide/generate a command defining the resource) and/or otherwise use the resource to at least partially depict page I. Other examples are possible as well. Upon completion of the procedures of block 1242, the computing device can proceed to block 1220.

At block 1250, the computing device can determine whether input IN2 is a resource reference or a resource definition based on the parse of input IN2 performed at block 1220. If input IN2 is a resource reference, the computing device can proceed to block 1252. Otherwise, the computing device can determine that input IN2 is a resource definition and proceed to block 1270.

At block 1252, the computing device can determine whether the resource referred to by input IN2 is in in-memory cache IMC. For example, the computing device can query the IMC to determine whether or not the resource referred to by input IN2 is in in-memory cache IMC, where IMC can be queried based on an identifier or other data used by input IN2 to refer to a resource. If the resource referred to by input IN2 is in in-memory cache IMC, the computing device can proceed to block 1254. Otherwise, the computing device can determine that the resource referred to by input IN2 is not in in-memory cache IMC and can proceed to block 1262.

At block 1254, the computing device can obtain a resource RES2 referred to by input IN2 from in-memory cache IMC.

At block 1256, the computing device can also decrement a reference count REFCNT for RES2 in resource table RT by 1; i.e., set REFCNT=REFCNT−1.

At block 1258, the computing device can determine whether the reference count REFCNT for RES2 in resource table RT is less than or equal to 0 (zero). If the reference count REFCNT for RES2 in resource table RT is less than or equal to 0, the computing device can proceed to block 1258. Otherwise, the computing device can determine that the reference count REFCNT for RES2 in resource table RT is greater than 0 and can proceed to block 1242.

At block 1260, the computing device can remove entry for DEFN2 in resource table RT, as the reference count REFCNT for RES2 in resource table RT is less than or equal to 0, which indicates that the last use of RES2 has occurred. Upon completion of the procedures of block 1258, the computing device can proceed to block 1242.

At block 1262, the computing device can determine whether an external caching service ECS is used during execution of method 1000. Determining whether an external caching service is used by the computing device is discussed in more detail at least in the context of block 740. If the computing device determines that external caching service ECS is being used during execution of method 1000, the computing device can proceed to block 1264. Otherwise, the computing device can determine that an external caching service is not being used during execution of method 1000 and can proceed to block 1292.

At block 1264, the computing device can obtain a resource RES2 referred to by input IN2 from external caching service ECS. Upon completion of the procedures of block 1264, the computing device can proceed to block 1256.

At block 1270, the computing device can determine whether the resource defined by input IN2 is in in-memory cache IMC. For example, the computing device can query IMC to determine whether or not the resource defined by input IN2 is in in-memory cache IMC, where IMC can be queried based on an identifier or other data used by input IN2 to define a resource. If the resource defined by input IN2 is in in-memory cache IMC, the computing device can proceed to block 1220, as there the resource defined by input IN2 is already stored in in-memory cache IMC (i.e., input IN2 is a duplicate definition of a resource). Otherwise, the computing device can determine that the resource referred to by input IN2 is not in in-memory cache IMC and can proceed to block 1280.

At block 1280, the computing device can determine whether the resource defined by input IN2 can be stored in in-memory cache IMC. For example, the computing device can query IMC to determine whether or not enough space is available to store the resource defined by input IN2 in IMC. If the resource defined by input IN2 can be stored in IMC, then the computing device can proceed to block 1282. Otherwise, the computing device can determine that the resource defined by input IN2 cannot be stored in IMC and can proceed to block 1284.

At block 1282, the computing device can store the resource defined by input IN2 in in-memory cache IMC. Upon completion of the procedures of block 1282, the computing device can proceed to block 1220.

At block 1284, the computing device can let a resource RES3 be the resource referred to by input IN2.

At block 1290, the computing device can determine whether an external caching service ECS is used during execution of method 1000. Determining whether an external caching service is used by the computing device is discussed in more detail at least in the context of block 740. If the computing device determines that external caching service ECS is being used during execution of method 1000, the computing device can proceed to block 1294. Otherwise, the computing device can determine that an external caching service is not being used during execution of method 1000 and can proceed to block 1292.

At block 1292, the computing device can report and/or otherwise handle an out-of-memory error. In some examples, method 1000 can be completed as part of reporting and/or otherwise handling an out-of-memory error. In some examples, method 1000 can proceed after reporting and/or otherwise handling an out-of-memory error; e.g., by proceeding from block 1292 to block 1220 to continue reading and parsing page I. Other techniques for reporting and/or otherwise handling an out-of-memory error are possible as well.

At block 1294, the computing device can remove a least-recently used resource LRUR from in-memory cache IMC, can store LRUR using the external caching service ECS, and can store resource RES3 in IMC. Upon completion of the procedures of block 1294, the computing device can proceed to block 1220.

Example Methods of Operation

FIG. 13 shows a flowchart for method 1300, according to example embodiments. Method 1300 can be used to encode a data stream, such as, but not limited to, a data stream of data from a file. Method 1300 can be carried out by a computing device, such as computing device 200. In some examples, method 1300 can be carried out by a printing device, such as printing device 110, printing device 112, and/or printing device 114 and/or by a computing device that is a component of a printing device.

Method 1300 can begin at block 1310, where the computing device can receive an encoder-input data stream encoded in an encoder-input format, such as discussed herein at least in the context of FIGS. 6-9.

At block 1320, the computing device can reformat the encoder-input data stream into an encoder-output data stream encoded in an encoder-output format using the computing device, the encoder-output data stream including a page table for one or more pages in the encoder-output data stream, one or more resources of the one or more pages in the encoder-output data stream, and one or more commands related to the one or more resources, the one or more commands in a binary format, the page table including references to the one or more pages of the encoder-output data stream, the one or more resources including one or more reusable resources that are used multiple times in the encoder-output data stream, where the encoder-input format differs from the encoder-output format, where the encoder-output data stream is based on a resource table storing entries for each of the one or more reusable resources, where each of the one or more reusable resources is stored only once in the encoder-output data stream, and where the one or more resources are stored in first-come, first-served fashion in the encoder-output data stream, such as discussed herein at least in the context of FIGS. 6-9.

At block 1330, the computing device can generate an output of the computing device that is based on the encoder-output data stream, such as discussed herein at least in the context of FIGS. 6-9.

In some examples, where reformatting the encoder-input data stream into the encoder-output data stream includes: parsing the encoder-input data stream to identify the one or more reusable resources in the encoder-input data stream; for each reusable resource of the one or more reusable resources, determining one or more corresponding pages of the encoder-input data stream that utilize the reusable resource; and creating the resource table, where the resource table includes a resource-table entry for each reusable resource of the one or more reusable resources, the resource-table entry including an offset where the reusable resource is stored in the encoder-output data stream and information about the one or more pages that of the encoder-input data stream that utilize the reusable resource, such as discussed herein at least in the context of FIGS. 6-9.

In some examples, where reformatting the encoder-input data stream into the encoder-output data stream includes: parsing the encoder-input data stream to identify the one or more reusable resources in the encoder-input data stream; for each reusable resource of the one or more reusable resources, determining a reference count indicating a number of times that the reusable resource is utilized in the encoder-input data stream; and creating the resource table, where the resource table includes a resource-table entry for each reusable resource of the one or more reusable resources, the resource-table entry including an offset where the reusable resource is stored in the encoder-output data stream and the reference count for the reusable resource, such as discussed herein at least in the context of FIGS. 6-9.

In some examples, where the encoder-input data stream includes one or more input pages, and where reformatting the encoder-input data stream into the encoder-output data stream includes: saving the resource table to the encoder-output data stream; and reformatting the encoder-input data stream into the encoder-output data stream by at least: for each input page of the one or more input pages: creating a new page in the encoder-output data stream for the input page; reading input content from the input page of the encoder-input data stream; and adding output content to the new page in the encoder-output data stream, where the output content is based on the input content, such as discussed herein at least in the context of FIGS. 6-9.

In some examples, where adding the output content to the new page includes: determining whether the input content includes one or more input commands; reformatting the one or more input commands as one or more output commands in the binary format; and adding the one or more output commands to the new page, such as discussed herein at least in the context of FIGS. 6-9.

In some examples, where adding the output content to the new page includes: determining whether the input content relates to an input resource reference; after determining that the input content relates to the input resource reference, determining whether the input resource reference has an entry in the resource table; after determining that the input resource reference has input-resource-reference entry in the resource table, determining one or more output commands in binary format based on the input resource reference and the input-resource-reference entry in the resource table; and adding the one or more output commands to the new page, such as discussed herein at least in the context of FIGS. 6-9.

In some examples, where adding the output content to the new page includes: determining whether the input content relates to an input resource reference; after determining that the input content relates to the input resource reference, determining whether the input resource reference has an input-resource-reference entry in the resource table; after determining that the input resource reference does not have an input-resource-reference entry in the resource table, determining whether the input resource reference refers to a deferred resource on a deferred list; after determining that the input resource reference refers to a deferred resource on the deferred list: retrieving the deferred resource from the deferred list; removing the deferred resource from the deferred list; determining one or more output commands in binary format based on the deferred resource; and adding the one or more output commands to the new page, such as discussed herein at least in the context of FIGS. 6-9.

In some examples, where adding the output content to the new page includes: determining whether the input content relates to an input resource reference; after determining that the input content relates to the input resource reference, determining whether the input resource reference has an input-resource-reference entry in the resource table; after determining that the input resource reference does not have an input-resource-reference entry in the resource table, determining whether the input resource reference refers to a deferred resource on a deferred list; after determining that the input resource reference does not refer to a deferred resource on the deferred list: retrieving input-resource data referred to by the input resource reference from the encoder-input data stream; determining one or more output commands in binary format based on the input-resource data; and adding the one or more output commands to the new page, such as discussed herein at least in the context of FIGS. 6-9.

In some examples, where adding the output content to the new page includes: determining whether the input content relates to an input resource reference; after determining that the input content does not relate to an input resource reference, determining whether the input content relates to a resource used on the input page; after determining that the input content relates to a resource used on the input page, determining whether the resource used on the input page related to the input content also relates to a previous resource having an entry in the resource table; after determining the resource used on the input page related to the input content does not relate to a previous resource having an entry in the resource table, determining whether the input content relates to a deferred resource on a deferred list; after determining that the input content relates to a deferred resource on the deferred list: retrieving the deferred resource from the deferred list; removing the deferred resource from the deferred list; determining one or more output commands in binary format based on the deferred resource; and adding the one or more output commands to the new page, such as discussed herein at least in the context of FIGS. 6-9.

In some examples, where adding the output content to the new page includes: determining whether the input content relates to an input resource reference; after determining that the input content does not relate to an input resource reference, determining whether the input content relates to a resource used on the input page; after determining that the input content relates to a resource used on the input page, determining whether the resource used on the input page related to the input content also relates to a previous resource having an entry in the resource table; after determining the resource used on the input page related to the input content does not relate to a previous resource having an entry in the resource table, determining whether the input content relates to a deferred resource on a deferred list; after determining that the input content does not relate to a deferred resource on the deferred list: determining input-resource data based on the input content; determining one or more output commands in binary format based on the input-resource data; and adding the one or more output commands to the new page, such as discussed herein at least in the context of FIGS. 6-9.

In some examples, where reformatting the encoder-input data stream into the encoder-output data stream further includes: after processing the encoder-input data stream, processing the resource table by at least: for each entry in the resource table, processing the entry by at least: determining a resource referred to by the entry, a reference count for the resource, and an offset into the encoder-output data stream based on the entry; and inserting the reference count for the resource at the offset into the encoder-output data stream; and after processing the resource table, removing the resource table from the encoder-output data stream, such as discussed herein at least in the context of FIGS. 6-9.

In some examples, where reformatting the encoder-input data stream into the encoder-output data stream further includes: after processing the encoder-input data stream, processing the resource table by at least: for each entry in the resource table, processing the entry by at least: determining a resource referred to by the entry, a list of pages associated with the resource, and an offset into the encoder-output data stream based on the entry; and inserting the list of pages associated with the resource at the offset into the encoder-output data stream; and after processing the resource table, removing the resource table from the encoder-output data stream, such as discussed herein at least in the context of FIGS. 6-9.

In some examples, where saving the resource table to the encoder-output data stream includes saving the resource table to the encoder-output data stream and to an external caching service, such as discussed herein at least in the context of FIGS. 6-9.

In some examples, where the one or more commands in the binary format include a command that includes: an operation code expressed as a number, a parameter size, and parameter data where a size of the parameter data equals the parameter size, such as discussed herein at least in the context of FIGS. 6-9.

In some examples, where the encoder-input format includes a portable document format (PDF), such as discussed herein at least in the context of FIGS. 6-9.

In some examples, where generating the output of the computing device includes: storing at least part of the encoder-output data stream in a file; storing at least part of the encoder-output data stream in a memory object; or storing at least part of the encoder-output data stream in a file and storing at least part of the encoder-output data stream in a memory object, such as discussed herein at least in the context of FIGS. 6-9.

In some examples, where generating the output of the computing device includes: printing at least part of the encoder-output data stream on paper; generating a display of least part of the encoder-output data stream; or printing at least part of the encoder-output data stream on paper and generating a display of least part of the encoder-output data stream, such as discussed herein at least in the context of FIGS. 6-9.

FIG. 14 shows a flowchart for method 1400, according to example embodiments. Method 1400 can be used to encode a data stream, such as, but not limited to, a data stream of data from a file. Method 1400 can be carried out by a computing device, such as computing device 200. In some examples, method 1400 can be carried out by a printing device, such as printing device 110, printing device 112, and/or printing device 114, and/or by a computing device that is a component of a printing device.

Method 1400 can begin at block 1410, where the computing device can receive a decoder-input data stream encoded in a decoder-input format, the decoder-input data stream including a page table for one or more pages in the decoder-input data stream, one or more resources of the one or more pages in the decoder-input data stream, and one or more commands related to the one or more resources; the one or more commands in a binary format, the page table including references to the one or more pages of the decoder-input data stream, the one or more resources including one or more reusable resources that are used multiple times in the decoder-input data stream, where each of the one or more reusable resources is stored only once in the decoder-input data stream, and where the one or more resources are stored in first-come, first-served fashion in the decoder-input data stream, such as discussed herein at least in the context of FIGS. 10-12.

At block 1420, the computing device can decode the decoder-input data stream by the computing device executing the one or more commands to generate an output depicting the one or more pages, such as discussed herein at least in the context of FIGS. 10-12.

At block 1430, the computing device can provide the output depicting the one or more pages using the computing device, such as discussed herein at least in the context of FIGS. 10-12.

In some examples, where decoding the decoder-input data stream by the computing device executing the one or more commands to generate the output depicting the one or more pages includes: for each input page of the one or more pages in the decoder-input data stream: reading an input command of the one or more commands related to the one or more resources from the input page; and generating a portion of the output depicting the one or more pages based on the input command, such as discussed herein at least in the context of FIGS. 10-12.

In some examples, where the input command includes an operation code expressed as a binary number and parameter data, and where decoding the decoder-input data stream by the computing device executing the one or more commands to generate the output depicting the one or more pages includes: parsing the input command to determine the operation code and the parameter data; determining one or more output-related orders based on the operation code and the parameter data; and generating a portion of the output depicting the one or more pages based the one or more output-related orders, such as discussed herein at least in the context of FIGS. 10-12.

In some examples, where the decoder-input data stream indicates each of the one or more reusable resources using a resource table of the decoder-input data stream that stores entries for each of the one or more reusable resources, and where each entry of the resource table refers to a particular reusable resource of the one or more reusable resources and stores an offset where the particular reusable resource is stored in the decoder-input data stream and a reference count for the particular reusable resource indicating a number of times the particular reusable resource is used in the decoder-input data stream, such as discussed herein at least in the context of FIGS. 10-12.

In some examples, where generating the output of the computing device based on the decoder-input data stream includes: allocating a pre-determined amount of memory to store the resource table; determining whether the pre-determined amount of memory is large enough to store the resource table; after determining that the pre-determined amount of memory is large enough to store the resource table, reading the resource table from the decoder-input data stream into the pre-determined amount of memory; and after determining that the pre-determined amount of memory is not large enough to store the resource table, reading a portion of the resource table from the decoder-input data stream into the pre-determined amount of memory, such as discussed herein at least in the context of FIGS. 10-12.

In some examples, where generating the output of the computing device based on the decoder-input data stream includes: reading input content from the decoder-input data stream; determining whether the input content relates to an input resource of the one or more resources of the one or more pages in the decoder-input data stream; after determining that the input content relates to the input resource, determining whether the pre-determined amount of memory stores an entry for the input resource; after determining that the pre-determined amount of memory does not store an entry for the input resource, determining whether the pre-determined amount of memory has enough memory to store the entry for the input resource; and after determining that the pre-determined amount of memory has enough memory to store the entry for the input resource, reading the entry for the input resource from the decoder-input data stream into the pre-determined amount of memory, such as discussed herein at least in the context of FIGS. 10-12.

In some examples, where generating the output of the computing device based on the decoder-input data stream includes: reading input content from the decoder-input data stream; determining whether the input content relates to an input resource of the one or more resources of the one or more pages in the decoder-input data stream; after determining that the input content relates to the input resource, determining whether the pre-determined amount of memory stores an entry for the input resource; after determining that the pre-determined amount of memory does not store an entry for the input resource, determining whether the pre-determined amount of memory has enough memory to store the entry for the input resource; and after determining that the pre-determined amount of memory does not have enough memory to store the entry for the input resource, indicating occurrence of an error related to the input resource, such as discussed herein at least in the context of FIGS. 10-12.

In some examples, where generating the output of the computing device based on the decoder-input data stream includes: reading input content from the decoder-input data stream; determining whether the input content relates to an input resource of the one or more resources of the one or more pages in the decoder-input data stream; after determining that the input content relates to the input resource, determining whether the pre-determined amount of memory stores an entry for the input resource; and after determining that the pre-determined amount of memory stores the entry for the input resource: retrieving the entry for the input resource from the pre-determined amount of memory; decrementing the reference count of the entry for the input resource; and generating the output of the computing device based on the input resource, such as discussed herein at least in the context of FIGS. 10-12.

In some examples, where generating the output of the computing device based on the decoder-input data stream includes: after decrementing the reference count of the entry for the input resource, determining whether the reference count of the entry for the input resource is zero; and after determining that the reference count of the entry for the input resource is zero, removing the entry for the input resource from the pre-determined amount of memory, such as discussed herein at least in the context of FIGS. 10-12.

In some examples, where generating the output of the computing device based on the decoder-input data stream includes: allocating a pre-determined amount of memory to store the resource table; determining whether the pre-determined amount of memory is large enough to store the resource table; after determining that the pre-determined amount of memory is not large enough to store the resource table, determining whether an external caching service is available; and after determining that the external caching service is available: reading a first portion of the resource table from the decoder-input data stream into the pre-determined amount of memory; and reading a second portion of the resource table from the decoder-input data stream using the external caching service, where the first and second portions of the resource table include all of the resource table, such as discussed herein at least in the context of FIGS. 10-12.

In some examples, where generating the output of the computing device based on the decoder-input data stream includes: reading input content from the decoder-input data stream; determining whether the input content relates to an input resource of the one or more resources of the one or more pages in the decoder-input data stream; after determining that the input content relates to the input resource, determining whether the pre-determined amount of memory stores an entry for the input resource; and after determining that the pre-determined amount of memory does not store an entry for the input resource: retrieving the entry for the input resource from the external caching service; decrementing the reference count of the entry for the input resource; and generating the output of the computing device based on the input resource, such as discussed herein at least in the context of FIGS. 10-12.

In some examples, where the computing device includes a plurality of processing instances configured to be utilized in parallel, and where generating the output of the computing device based on the decoder-input data stream includes: for each input page of the one or more pages in the decoder-input data stream: selecting a processing instance of the plurality of processing instances for the input page; and generating an output based on the input page utilizing the processing instance, such as discussed herein at least in the context of FIGS. 10-12.

In some examples, where the plurality of processing instances includes one or more raster image processors (RIPs), such as discussed herein at least in the context of FIGS. 10-12.

In some examples, where the decoder-input data stream indicates each reusable resource of the one or more reusable resources using one or more reference counts for the one or more reusable resources, where a reference count for a reusable resource indicates a number of times the reusable resource is used in the decoder-input data stream, and where the reference count for the reusable resource is included with the reusable resource in the decoder-input data stream, such as discussed herein at least in the context of FIGS. 10-12.

In some examples, where the one or more commands in the binary format include a command that includes: an operation code expressed as a number, a parameter size, and parameter data where a size of the parameter data equals the parameter size, such as discussed herein at least in the context of FIGS. 10-12.

In some examples, where receiving the decoder-input data stream includes receiving a page selection of one or more selected pages of the one or more pages in the decoder-input data stream; and where generating the output of the computing device includes generating a selected output of the computing device, where the selected output only includes output for at least one selected page of the one or more selected pages, such as discussed herein at least in the context of FIGS. 10-12.

In some examples, where generating the output of the computing device includes: printing at least part of the output of the computing device on paper; generating a display of least part of the output of the computing device; or printing at least part of the output of the computing device on paper and generating a display of least part of the output of the computing device, such as discussed herein at least in the context of FIGS. 10-12.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
receiving, at a computing device, an encoder-input data stream encoded in a first encoder-input format;
reformatting the encoder-input data stream into an encoder-output data stream encoded in an encoder-output format using the computing device, the encoder-output data stream including a page table for one or more pages in the encoder-output data stream, one or more resources of the one or more pages in the encoder-output data stream, and one or more commands related to the one or more resources, the one or more commands in a binary format, the page table including references to the one or more pages of the encoder-output data stream, the one or more resources comprising one or more reusable resources that are used multiple times in the encoder-output data stream, wherein the encoder-input format differs from the encoder-output format, wherein the encoder-output data stream is based on a resource table storing entries for each of the one or more reusable resources, wherein each of the one or more reusable resources is stored only once in the encoder-output data stream, and wherein the one or more resources are stored in first-come, first-served fashion in the encoder-output data stream; and
generating an output of the computing device that is based on the encoder-output data stream.

2. The method of claim 1, wherein reformatting the encoder-input data stream into the encoder-output data stream comprises:
parsing the encoder-input data stream to identify the one or more reusable resources in the encoder-input data stream;
for each reusable resource of the one or more reusable resources, determining one or more corresponding pages of the encoder-input data stream that utilize the reusable resource; and
creating the resource table, wherein the resource table comprises a resource-table entry for each reusable resource of the one or more reusable resources, the resource-table entry comprising an offset where the reusable resource is stored in the encoder-output data stream and information about the one or more pages that of the encoder-input data stream that utilize the reusable resource.

3. The method of claim 1, wherein reformatting the encoder-input data stream into the encoder-output data stream comprises:
parsing the encoder-input data stream to identify the one or more reusable resources in the encoder-input data stream;
for each reusable resource of the one or more reusable resources, determining a reference count indicating a number of times that the reusable resource is utilized in the encoder-input data stream; and
creating the resource table, wherein the resource table comprises a resource-table entry for each reusable resource of the one or more reusable resources, the resource-table entry comprising an offset where the reusable resource is stored in the encoder-output data stream and the reference count for the reusable resource.

4. The method of claim 1, wherein the encoder-input data stream comprises one or more input pages, and wherein reformatting the encoder-input data stream into the encoder-output data stream comprises:
saving the resource table to the encoder-output data stream; and
reformatting the encoder-input data stream into the encoder-output data stream by at least:
for each input page of the one or more input pages:
creating a new page in the encoder-output data stream for the input page;
reading input content from the input page of the encoder-input data stream; and
adding output content to the new page in the encoder-output data stream,
wherein the output content is based on the input content.

5. The method of claim 4, wherein adding the output content to the new page comprises:
determining whether the input content comprises one or more input commands;
reformatting the one or more input commands as one or more output commands in the binary format; and
adding the one or more output commands to the new page.

6. The method of claim 4, wherein adding the output content to the new page comprises:
determining whether the input content relates to an input resource reference;
after determining that the input content relates to the input resource reference, determining whether the input resource reference has an input-resource-reference entry in the resource table;
after determining that the input resource reference has the input-resource-reference entry in the resource table, determining one or more output commands in binary format based on the input resource reference and the input-resource-reference entry in the resource table; and
adding the one or more output commands to the new page.

7. The method of claim 4, wherein adding the output content to the new page comprises:
determining whether the input content relates to an input resource reference;
after determining that the input content relates to the input resource reference, determining whether the input resource reference has an input-resource-reference entry in the resource table;
after determining that the input resource reference does not have the input-resource-reference entry in the resource table, determining whether the input resource reference refers to a deferred resource on a deferred list;
after determining that the input resource reference refers to the deferred resource on the deferred list:
retrieving the deferred resource from the deferred list;
removing the deferred resource from the deferred list;
determining one or more output commands in binary format based on the deferred resource; and
adding the one or more output commands to the new page.

8. The method of claim 4, wherein adding the output content to the new page comprises:
determining whether the input content relates to an input resource reference;
after determining that the input content relates to the input resource reference, determining whether the input resource reference has an input-resource-reference entry in the resource table;
after determining that the input resource reference does not have the input-resource-reference entry in the resource table, determining whether the input resource reference refers to a deferred resource on a deferred list;
after determining that the input resource reference does not refer to the deferred resource on the deferred list:
retrieving input-resource data referred to by the input resource reference from the encoder-input data stream;
determining one or more output commands in binary format based on the input-resource data; and
adding the one or more output commands to the new page.

9. The method of claim 4, wherein adding the output content to the new page comprises:
determining whether the input content relates to an input resource reference;
after determining that the input content does not relate to the input resource reference, determining whether the input content relates to a resource used on the input page;
after determining that the input content relates to the resource used on the input page, determining whether the resource used on the input page related to the input content also relates to a previous resource having an entry in the resource table;
after determining the resource used on the input page related to the input content does not relate to the previous resource having the entry in the resource table, determining whether the input content relates to a deferred resource on a deferred list;
after determining that the input content relates to the deferred resource on the deferred list:
retrieving the deferred resource from the deferred list;
removing the deferred resource from the deferred list;
determining one or more output commands in binary format based on the deferred resource; and
adding the one or more output commands to the new page.

10. The method of claim 4, wherein adding the output content to the new page comprises:
determining whether the input content relates to an input resource reference;
after determining that the input content does not relate to the input resource reference, determining whether the input content relates to a resource used on the input page;
after determining that the input content relates to the resource used on the input page, determining whether the resource used on the input page related to the input content also relates to a previous resource having an entry in the resource table;
after determining the resource used on the input page related to the input content does not relate to the previous resource having the entry in the resource table, determining whether the input content relates to a deferred resource on a deferred list;
after determining that the input content does not relate to the deferred resource on the deferred list:
determining input-resource data based on the input content;
determining one or more output commands in binary format based on the input-resource data; and
adding the one or more output commands to the new page.

11. The method of claim 4, wherein reformatting the encoder-input data stream into the encoder-output data stream further comprises:
after processing the encoder-input data stream, processing the resource table by at least:
for each entry in the resource table, processing the entry by at least:
determining a resource referred to by the entry, a reference count for the resource, and an offset into the encoder-output data stream based on the entry; and
inserting the reference count for the resource at the offset into the encoder-output data stream; and
after processing the resource table, removing the resource table from the encoder-output data stream.

12. The method of claim 4, wherein reformatting the encoder-input data stream into the encoder-output data stream further comprises:
after processing the encoder-data stream, processing the resource table by at least:
for each entry in the resource table, processing the entry by at least:
determining a resource referred to by the entry, a list of pages associated with the resource, and an offset into the encoder-output data stream based on the entry; and
inserting the list of pages associated with the resource at the offset into the encoder-output data stream; and
after processing the resource table, removing the resource table from the encoder-output data stream.

13. The method of claim 4, wherein saving the resource table to the encoder-output data stream comprises saving the resource table to the encoder-output data stream and to an external caching service.

14. The method of claim 1, wherein the one or more commands in the binary format comprise a command that includes: an operation code expressed as a number, a parameter size, and parameter data wherein a size of the parameter data equals the parameter size.

15. The method of claim 1, wherein the encoder-input format comprises a portable document format (PDF).

16. The method of claim 1, wherein generating the output of the computing device comprises:
storing at least part of the encoder-output data stream in a file;
storing at least part of the encoder-output data stream in a memory object; or
storing at least part of the encoder-output data stream in a file and storing at least part of the encoder-output data stream in a memory object.

17. The method of claim 1, wherein generating the output of the computing device comprises:
printing at least part of the encoder-output data stream on paper;
generating a display of at least part of the encoder-output data stream; or
printing at least part of the encoder-output data stream on paper and generating a display of at least part of the encoder-output data stream.

18. A computing device, comprising:
one or more processors; and
data storage configured to store at least computer-readable instructions that, when executed by the one or more processors, cause the computing device to perform tasks comprising:
receiving an encoder-input data stream encoded in a encoder-input format;
reformatting the encoder-input data stream into an encoder-output data stream encoded in an encoder-output format, the encoder-output data stream including a page table for one or more pages in the encoder-output data stream, one or more resources of the one or more pages in the encoder-output data stream, and one or more commands related to the one or more resources, the one or more commands in a binary format, the page table including references to the one or more pages of the encoder-output data stream, the one or more resources comprising one or more reusable resources that are used multiple times in the encoder-output data stream, wherein the encoder-input format differs from the encoder-output format, wherein the encoder-output data stream is based on a resource table storing entries for each of the one or more reusable resources, wherein each of the one or more reusable resources is stored only once in the encoder-output data stream, and wherein the one or more resources are stored in first-come, first-served fashion in the encoder-output data stream; and
generating an output that is based on the encoder-output data stream.

19. The computing device of claim 18, wherein the computing device is a component of a printing device.

20. An article of manufacture comprising non-transitory data storage storing at least computer-readable instructions that, when executed by one or more processors of a computing device, cause the computing device to perform tasks comprising:
receiving an encoder-input data stream encoded in a encoder-input format;
reformatting the encoder-input data stream into an encoder-output data stream encoded in an encoder-output format, the encoder-output data stream including a page table for one or more pages in the encoder-output data stream, one or more resources of the one or more pages in the encoder-output data stream, and one or more commands related to the one or more resources, the one or more commands in a binary format, the page table including references to the one or more pages of the encoder-output data stream, the one or more resources comprising one or more reusable resources that are used multiple times in the encoder-output data stream, wherein the encoder-input format differs from the encoder-output format, wherein the encoder-output data stream is based on a resource table storing entries for each of the one or more reusable resources, wherein each of the one or more reusable resources is stored only once in the encoder-output data stream, and wherein the one or more resources are stored in first-come, first-served fashion in the encoder-output data stream; and
generating an output that is based on the encoder-output data stream.

* * * * *